US011023038B2

(12) United States Patent
Yasuda et al.

(10) Patent No.: US 11,023,038 B2
(45) Date of Patent: Jun. 1, 2021

(54) LINE OF SIGHT DETECTION ADJUSTMENT UNIT AND CONTROL METHOD

(71) Applicant: SONY CORPORATION, Tokyo (JP)

(72) Inventors: Ryouhei Yasuda, Kanagawa (JP); Takuro Noda, Tokyo (JP)

(73) Assignee: SONY CORPORATION, Tokyo (JP)

( * ) Notice: Subject to any disclaimer, the term of this patent is extended or adjusted under 35 U.S.C. 154(b) by 418 days.

(21) Appl. No.: 15/552,551

(22) PCT Filed: Nov. 25, 2015

(86) PCT No.: PCT/JP2015/083013
§ 371 (c)(1),
(2) Date: Aug. 22, 2017

(87) PCT Pub. No.: WO2016/139850
PCT Pub. Date: Sep. 9, 2016

(65) Prior Publication Data
US 2018/0032131 A1 Feb. 1, 2018

(30) Foreign Application Priority Data
Mar. 5, 2015 (JP) .............................. JP2015-043389

(51) Int. Cl.
*G06F 3/01* (2006.01)
*G06F 3/0346* (2013.01)
(Continued)

(52) U.S. Cl.
CPC ............ *G06F 3/013* (2013.01); *B60R 16/037* (2013.01); *G06F 3/002* (2013.01); *G06F 3/01* (2013.01);
(Continued)

(58) Field of Classification Search
CPC . G06F 3/01; G06F 3/013; G06F 3/002; G06F 3/0346; G06F 3/037; G06F 3/038; G06F 3/04817; B60R 16/037
See application file for complete search history.

(56) References Cited

U.S. PATENT DOCUMENTS 6,346,929 B1 * 2/2002 Fukushima ............. G06F 3/013
345/156
6,559,870 B1 5/2003 Anabuki et al.
(Continued)

FOREIGN PATENT DOCUMENTS

EP 1039364 A2 9/2000
JP 09-238905 A 9/1997
(Continued)

OTHER PUBLICATIONS

International Search Report and Written Opinion of PCT Application No. PCT/JP2015/083013, dated Feb. 23, 2016, 02 pages of English Translation and 07 pages of ISRWO.

*Primary Examiner* — Alexander Eisen
*Assistant Examiner* — Nathaniel P Brittingham
(74) *Attorney, Agent, or Firm* — Chip Law Group

(57) ABSTRACT

Provided is an information processing device and a control method that can eliminate the need for an operation merely for line-of-sight detection calibration and can perform line-of-sight detection calibration in a normal user operation. An information processing device including a recognition unit to recognize a position of a target of gaze following a user operation, a line-of-sight detection unit to detect a line-of-sight position of a user during the user operation, and a line-of-sight detection adjustment unit to perform an adjustment to line-of-sight detection performed by the line-of-sight detection unit on the basis of the recognized position of the target of gaze and the line-of-sight position.

17 Claims, 25 Drawing Sheets

(51) Int. Cl.
*B60R 16/037* (2006.01)
*G06F 3/00* (2006.01)
*G06F 3/038* (2013.01)
*G06F 3/0481* (2013.01)

(52) U.S. Cl.
CPC ............ *G06F 3/038* (2013.01); *G06F 3/0346* (2013.01); *G06F 3/04817* (2013.01)

(56) References Cited

U.S. PATENT DOCUMENTS

| | | | |
|---|---|---|---|
| 6,677,969 B1 * | 1/2004 | Hongo | G06F 3/013 345/156 |
| 2006/0028400 A1 * | 2/2006 | Lapstun | G02B 26/06 345/8 |
| 2008/0074389 A1 * | 3/2008 | Beale | G06F 3/0481 345/161 |
| 2010/0103375 A1 * | 4/2010 | Chao | A61B 3/113 351/210 |
| 2013/0321265 A1 * | 12/2013 | Bychkov | G06F 3/011 345/156 |
| 2014/0055591 A1 * | 2/2014 | Katz | G06F 3/013 348/78 |
| 2014/0184494 A1 * | 7/2014 | Burachas | G06F 3/011 345/156 |
| 2014/0195918 A1 * | 7/2014 | Friedlander | G06F 3/04842 715/727 |
| 2014/0361996 A1 | 12/2014 | Eden et al. | |
| 2016/0139665 A1 * | 5/2016 | Lopez | G06F 3/013 345/156 |
| 2016/0342205 A1 * | 11/2016 | Shigeta | A61B 3/113 |
| 2017/0364149 A1 * | 12/2017 | Lu | G06F 3/013 |
| 2018/0032131 A1 * | 2/2018 | Yasuda | G06F 3/01 |
| 2019/0018487 A1 * | 1/2019 | Tsurumi | G06F 3/002 |

FOREIGN PATENT DOCUMENTS

| | | |
|---|---|---|
| JP | 11-76165 A | 3/1999 |
| JP | 2000-276610 A | 10/2000 |
| JP | 2010-030361 A | 2/2010 |
| JP | 2010-199789 A | 9/2010 |
| WO | 2014/197408 A1 | 12/2014 |

* cited by examiner

FIG. 17
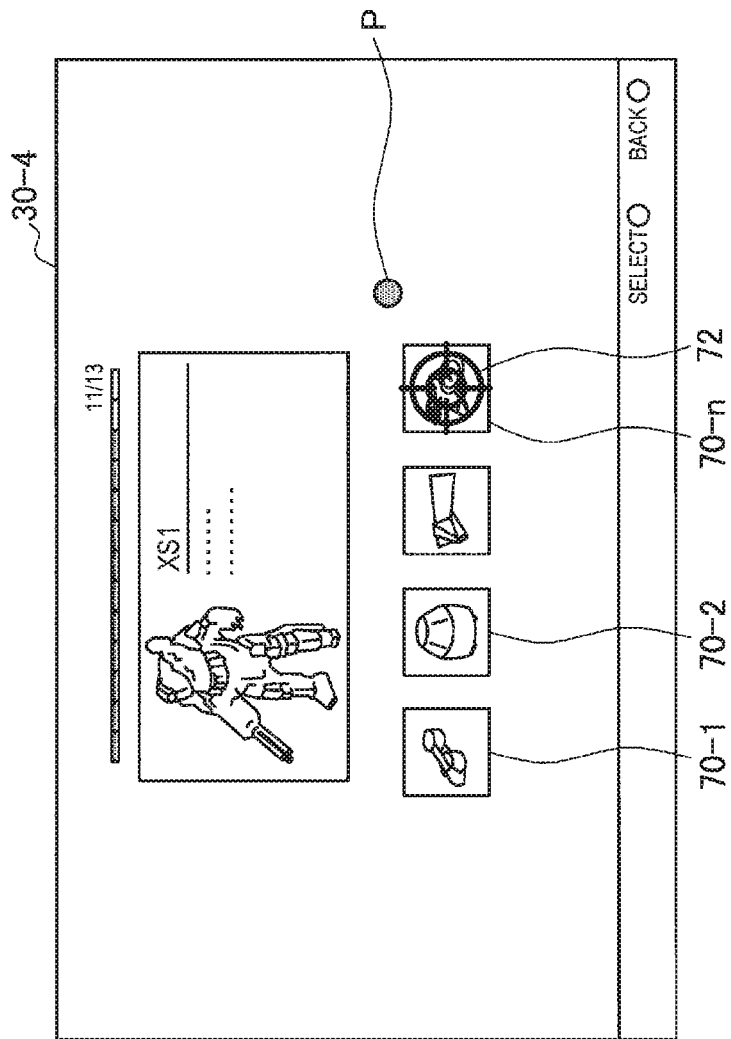
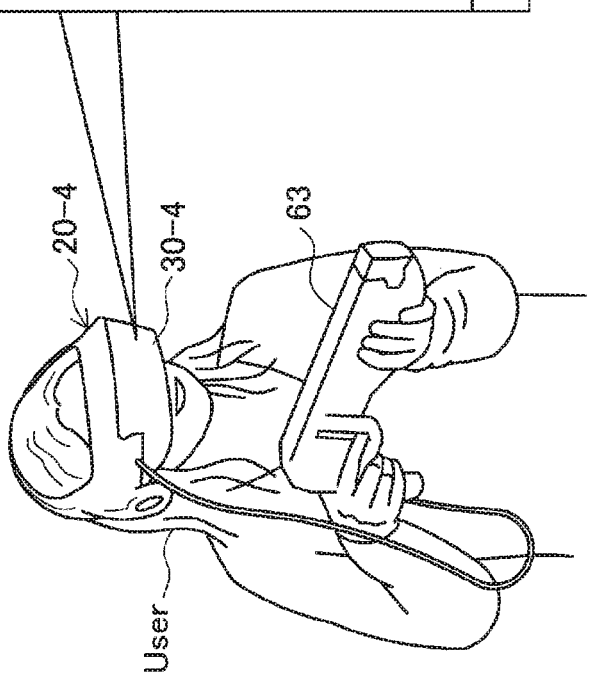

FIG. 20
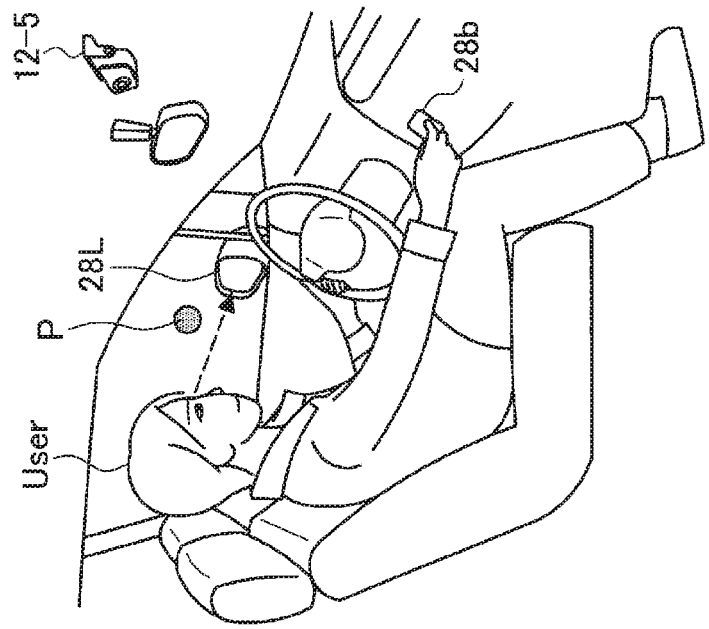
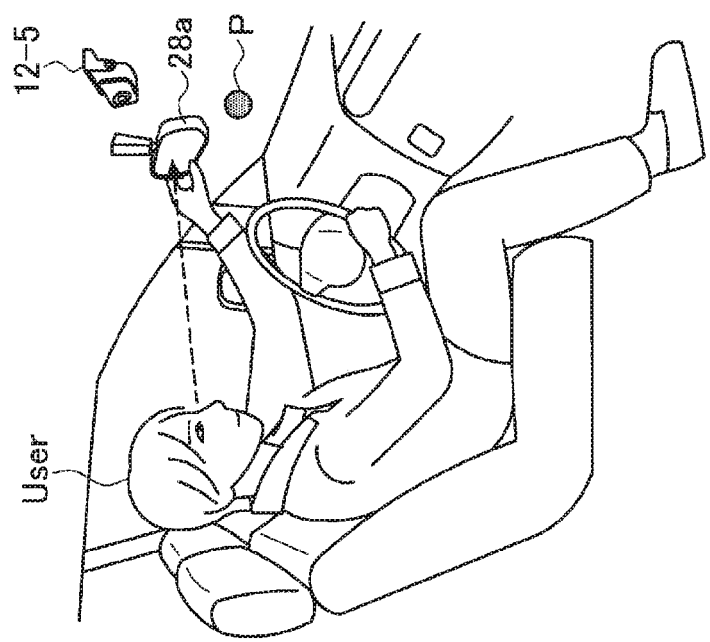

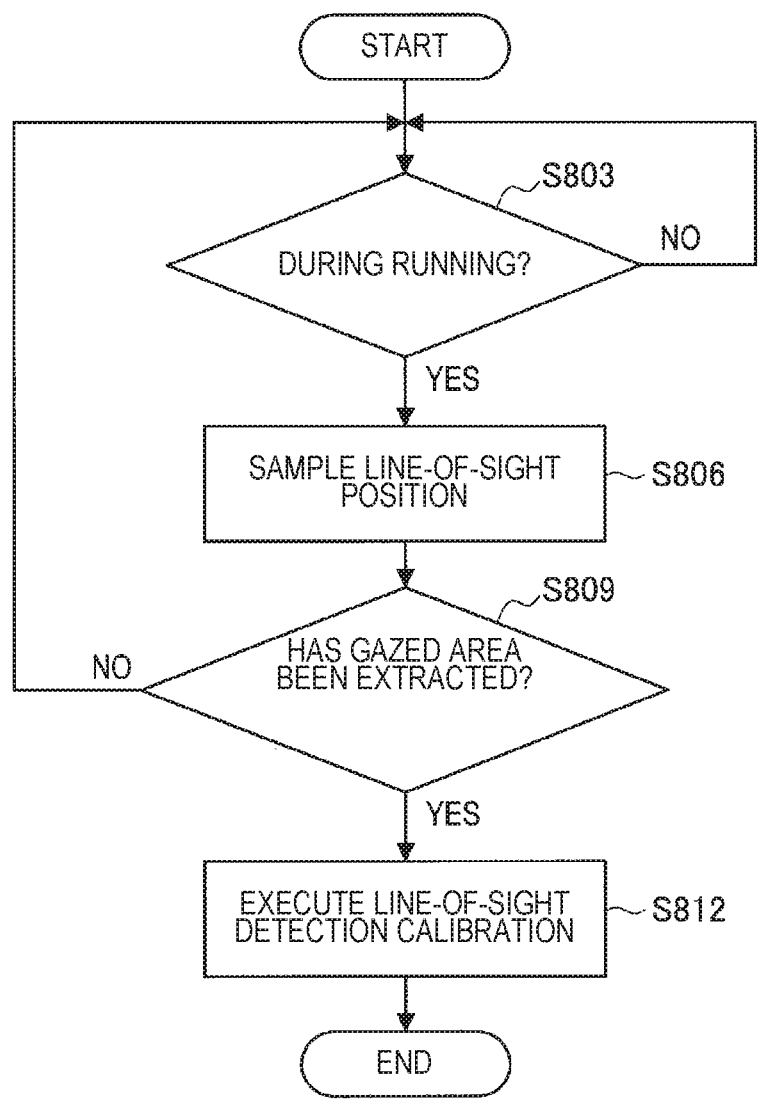

LINE OF SIGHT DETECTION ADJUSTMENT UNIT AND CONTROL METHOD

CROSS REFERENCE TO RELATED APPLICATIONS

This application is a U.S. National Phase of International Patent Application No. PCT/JP2015/083013 filed on Nov. 25, 2015, which claims priority benefit of Japanese Patent Application No. JP 2015-043389 filed in the Japan Patent Office on Mar. 5, 2015. Each of the above-referenced applications is hereby incorporated herein by reference in its entirety.

TECHNICAL FIELD

The present disclosure relates to an information processing device, a control method, and a program.

BACKGROUND ART

Conventionally, a line-of-sight detection technology has been proposed in which human or animal eyes (specifically, pupils, corneas) are shot to detect a line of sight and a point of gaze, or an electrode that detects the eye movement is mounted on the head to detect a line of sight and a point of gaze. By using such a line-of-sight detection technology, an operation input (a so-called line-of-sight input) based on the position and motion of the line of sight and the point of gaze can be made.

Moreover, in order to increase the accuracy of the line-of-sight detection technology, a technology related to line-of-sight calibration for correcting individual differences in line of sight among users has also been proposed. For example, Patent Literature 1 listed below proposes a calibration technology in which a visual target (that is, a calibration marker) is displayed at any point on an observation surface to guide the line of sight of a user, and on the basis of line-of-sight positions before and after the line-of-sight guidance, individual difference correction data for correcting a detection error due to individual differences among eyeballs of users is obtained.

CITATION LIST

Patent Literature

Patent Literature 1: JP 2001-4906A

DISCLOSURE OF INVENTION

Technical Problem

However, the conventional calibration technology as disclosed in the Patent Literature 1 listed above causes users to perform an operation or work merely for calibration, which is not related to an operation or work for accomplishing an original object of a device, resulting in burdens or distress for users.

Therefore, the present disclosure proposes an information processing device, a control method, and a program that can eliminate the need for an operation merely for line-of-sight detection calibration and can perform line-of-sight detection calibration in a normal user operation.

Solution to Problem

According to the present disclosure, there is proposed an information processing device including: a recognition unit configured to recognize a position of a target of gaze following a user operation; a line-of-sight detection unit configured to detect a line-of-sight position of a user during the user operation; and a line-of-sight detection adjustment unit configured to perform an adjustment to line-of-sight detection performed by the line-of-sight detection unit on the basis of the recognized position of the target of gaze and the line-of-sight position.

According to the present disclosure, there is proposed a control method including: recognizing a position of a target of gaze following a user operation; detecting a line-of-sight position of a user during the user operation; and performing an adjustment to line-of-sight detection by a line-of-sight detection adjustment unit on the basis of the recognized position of the target of gaze and the line-of-sight position.

According to the present disclosure, there is proposed a program for causing a computer to function as: a recognition unit configured to recognize a position of a target of gaze following a user operation; a line-of-sight detection unit configured to detect a line-of-sight position of a user during the user operation; and a line-of-sight detection adjustment unit configured to perform an adjustment to line-of-sight detection performed by the line-of-sight detection unit on the basis of the recognized position of the target of gaze and the line-of-sight position.

Advantageous Effects of Invention

As described above, according to the present disclosure, the need for an operation merely for line-of-sight detection calibration can be eliminated, and line-of-sight detection calibration can be performed in a normal user operation.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 17 is a view describing line-of-sight detection calibration according to a fourth embodiment.

FIG. 20 is a view describing line-of-sight detection calibration according to a fifth embodiment.

FIG. 25 is a flowchart showing an operational process of line-of-sight detection calibration according to the sixth embodiment.

MODE(S) FOR CARRYING OUT THE INVENTION

Figure 1:
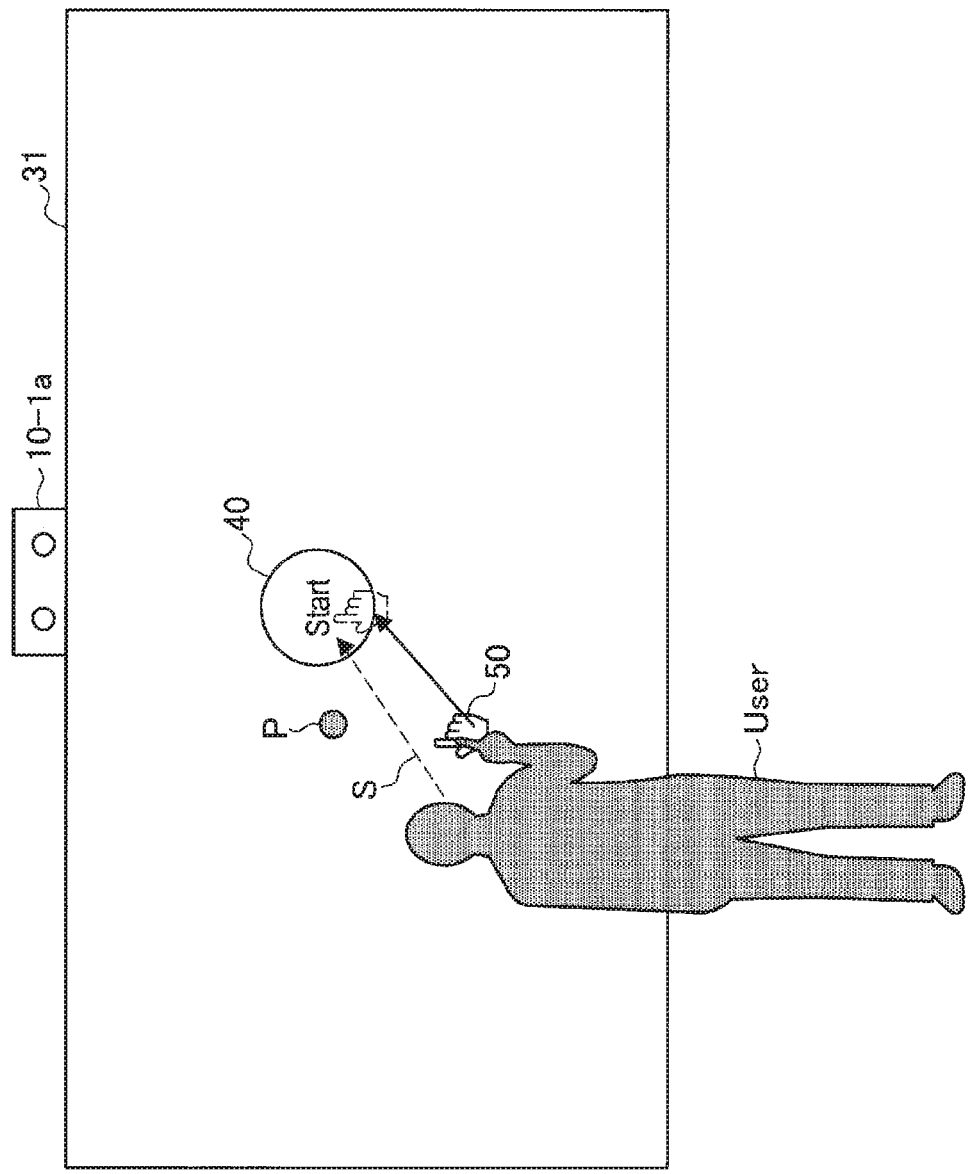
FIG. 1 is a view describing line-of-sight detection calibration when an indicator according to a first embodiment is a pointer.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

In addition, description will be provided in the following order.
1. Overview of line-of-sight detection calibration according to an embodiment of the present disclosure
2. Respective embodiments
2-1. First embodiment
2-1-1. Line-of-sight detection calibration when a pointer is used
2-1-2. Line-of-sight detection calibration when a controller is used
2-1-3. Line-of-sight detection calibration when a fingertip is used
2-2. Second embodiment
2-3. Third embodiment
2-4. Fourth embodiment
2-5. Fifth embodiment
2-6. Sixth embodiment
3. Conclusion

1. OVERVIEW OF LINE-OF-SIGHT DETECTION CALIBRATION ACCORDING TO AN EMBODIMENT OF THE PRESENT DISCLOSURE

Line-of-sight detection calibration according to an embodiment of the present disclosure recognizes the position of a target of gaze during a user operation of accomplishing an original object of a device, and performs an adjustment (that is, calibration) to line-of-sight detection on the basis of the recognized position of the target of gaze and the line-of-sight position of the user during the operation. Accordingly, the need for a conventional operation merely for line-of-sight detection calibration can be eliminated, and line-of-sight detection calibration can be performed in a normal user operation.

Hereinafter, an information processing system according to the present disclosure that achieves such line-of-sight detection calibration will be specifically described using a plurality of embodiments.

2. RESPECTIVE EMBODIMENTS

2-1. First Embodiment

First, line-of-sight detection calibration during a user operation in which an indicator is used will be described. An information processing device 20 according to the present embodiment recognizes a target of gaze of a user and detects the line-of-sight position of the user when the user moves the indicator to the target of gaze to perform line-of-sight detection calibration on the basis of a displacement between the position of the target of gaze and the line-of-sight position. The indicator may be a pointer (that is, a virtual object) which is an example of an operation target object displayed on a screen, or may be a controller (that is, a real object) which is an example of an operation target object held by a user, or may be a fingertip of the user when a gesture input can be made. Hereinafter, line-of-sight detection calibration during a user operation in which each pointer is used will be described using FIG. 1 to FIG. 8.

(2-1-1. Line-of-Sight Detection Calibration when a Pointer is Used)

An example of the indicator can be a pointer displayed on a screen. A user moves the pointer to a display region of a predetermined icon to select the icon, and has an application process corresponding to the icon executed. Such a situation will be described referring to FIG. 1.

(Overview)

FIG. 1 is a view describing line-of-sight detection calibration when the indicator according to the first embodiment is a pointer. As shown in FIG. 1, in a system in which a pointer 50 displayed on a screen 31, for example, is operated by a line of sight, a user who is a customer moves the pointer 50 to a start icon 40 displayed on the screen 31 with a fingertip, a remote controller or the like, as a use start operation of the system. The position of the fingertip and a line-of-sight position P of the user are detected on the basis of a captured image captured by a camera 10 installed in the vicinity of the screen 31.

In such a use start operation, it is assumed that the user visually checks the start icon 40 (a line of sight S) and moves the pointer 50 to the display region of the start icon 40. Therefore, line-of-sight detection calibration can be performed on the basis of a displacement between the line-of-sight position P detected when the pointer 50 is moved to the display region of the start icon 40 and (the center position of) the display region of the start icon 40 which is a target of gaze. An example of a system configuration that achieves such line-of-sight detection calibration is shown in FIG. 2.

(Configuration)

Figure 2:
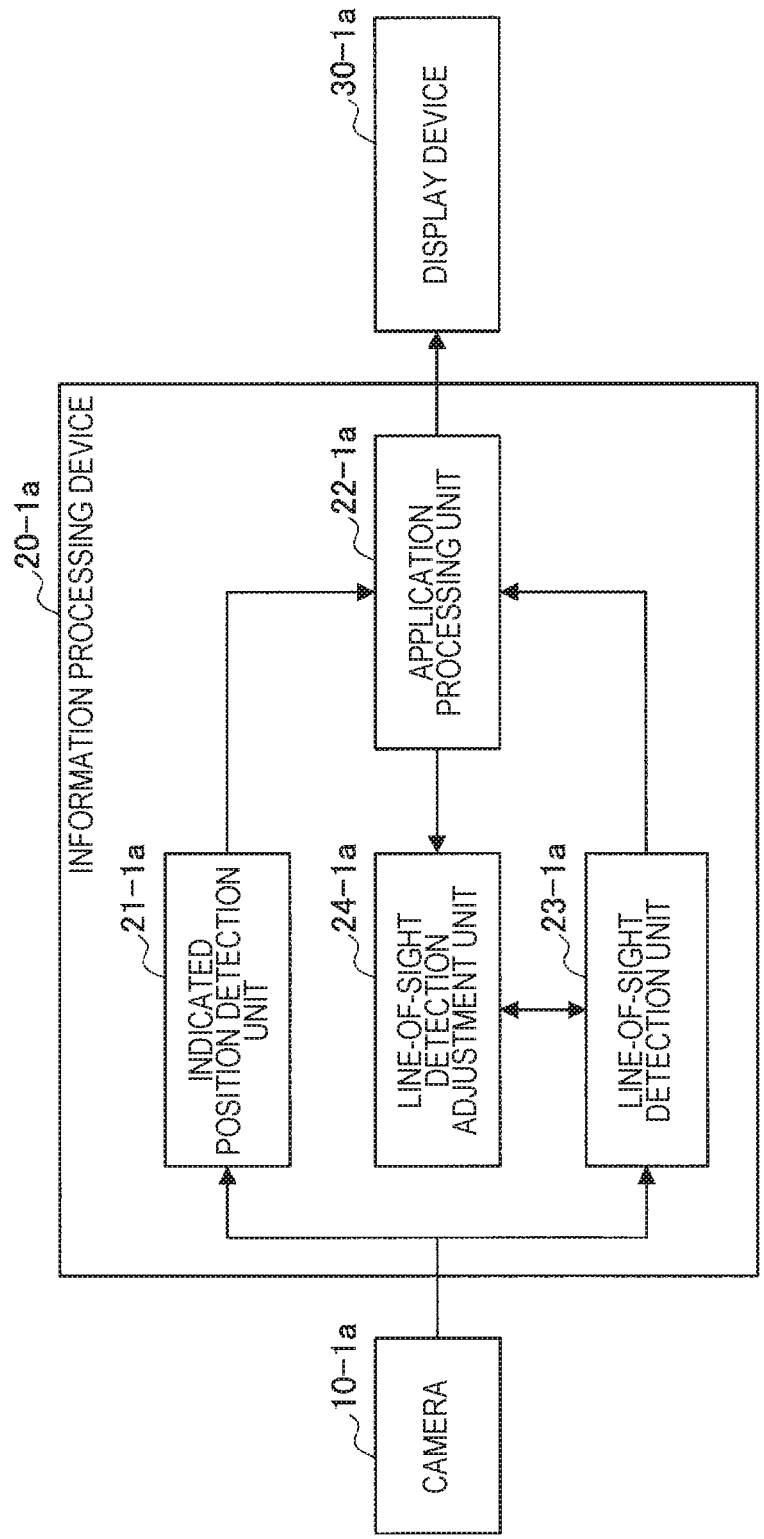
FIG. 2 is a view showing a configuration of an information processing system according to the first embodiment.

FIG. 2 is a view showing a configuration of an information processing system 101a according to the first embodiment. As shown in FIG. 2, the information processing system 101a includes the camera 10, an information processing device 20-1a, and a display device 30-1a.

The camera 10 is a stereo camera, for example, which captures an image of the face or body of a user present in front of the screen 31 and outputs the captured image to the information processing device 20-1a.

The display device 30-1a has a function of outputting an image in accordance with control of the information processing device 20-1a. The display device 30-1a may be implemented by a liquid crystal display, for example, or may be implemented by a projector that projects an image. In the example shown in FIG. 1, the display device 30-1a is implemented by a projector (not shown), and projects an image on the screen 31.

The information processing device 20-1a has a line-of-sight operating function of detecting the line of sight of the user on the basis of the captured image obtained from the camera 10, and performing an operation of the pointer 50 displayed on the display device 30-1a and the like in accordance with the line of sight. The information processing device 20-1a can also perform line-of-sight detection calibration for correcting a line-of-sight detection error due to individual differences along with a normal operation by the user.

Specifically, the information processing device 20-1a has an indicated position detection unit 21-1a, an application processing unit 22-1a, a line-of-sight detection unit 23-1a, and a line-of-sight detection adjustment unit 24-1a, as shown in FIG. 2.

The indicated position detection unit 21-1a detects a position indicated by the user on a display screen of the screen 31. For example, the indicated position detection unit 21-1a recognizes a fingertip of the user on the basis of a captured image captured by the camera 10, detects a position indicated with the fingertip on the display screen of the screen 31, and outputs a detected coordinate position to the application processing unit 22-1b. In addition, when the user is indicating with a gyro remote controller, the indicated position detection unit 21-1a recognizes the motion of the remote controller on the basis of a sensor value sensed by a gyro sensor mounted on the remote controller, detects a position indicated with the gyro remote controller on the display screen of the screen 31, and outputs a detected coordinate position to the application processing unit 22-1b. In addition, when the user is indicating with an infrared remote controller, the indicated position detection unit 21-1a recognizes the motion of the remote controller on the basis of infrared rays emitted from the remote controller, detects the position indicated with the infrared remote controller on the display screen of the screen 31, and outputs a detected coordinate position to the application processing unit 22-1b.

The application processing unit 22-1a controls the pointer 50 on the display screen displayed by the display device 30-1a in accordance with the line of sight of the user. The application processing unit 22-1a also controls the display position of the pointer on the display screen in accordance with the coordinate position of the indicated position detected by the indicated position detection unit 21-1a. In addition, in a case where the pointer 50 has selected an icon, the application processing unit 22-1a executes a process corresponding to the icon. In a case where the pointer 50 has moved to the display region of the start icon 40 as shown in FIG. 1, for example, an operation for starting use of a system that operates the pointer 50 with the line of sight is performed. Moreover, the application processing unit 22-1a also serves as a recognition unit that recognizes the coordinate position of an icon (an example of a target of gaze) on the display screen.

The line-of-sight detection unit 23-1a detects the line of sight (specifically, a line-of-sight direction or line-of-sight position, etc.) on the basis of a captured image of eyes of the user obtained from the camera 10.

The line-of-sight detection adjustment unit 24-1a obtains, from the application processing unit 22-1a, the display position and the display region (icon size) of the start icon 40 which is the target of gaze as well as the position of the pointer 50 moving in accordance with a user operation, and determines execution of line-of-sight detection calibration on the basis of whether the pointer 50 has stayed within the display region of the start icon 40 for a predetermined time period. The line-of-sight detection adjustment unit 24-1a also performs line-of-sight detection calibration on the basis of the line-of-sight positions P sampled continuously from the line-of-sight detection unit 23-1a while the pointer 50 stays within the display region of the start icon 40 and the display position of the start icon 40. Specifically, a correction parameter is calculated from a displacement between the detected line-of-sight position P and the center position of the display region of the start icon 40 to correct a line-of-sight detection error due to individual differences.

The configuration of the information processing system 101a according to the present embodiment has been specifically described above. Note that the system configuration shown in FIG. 2 is an example, and the present embodiment is not limited to this. For example, the system configuration of the present embodiment may be a configuration shown in FIG. 3.

Figure 3:
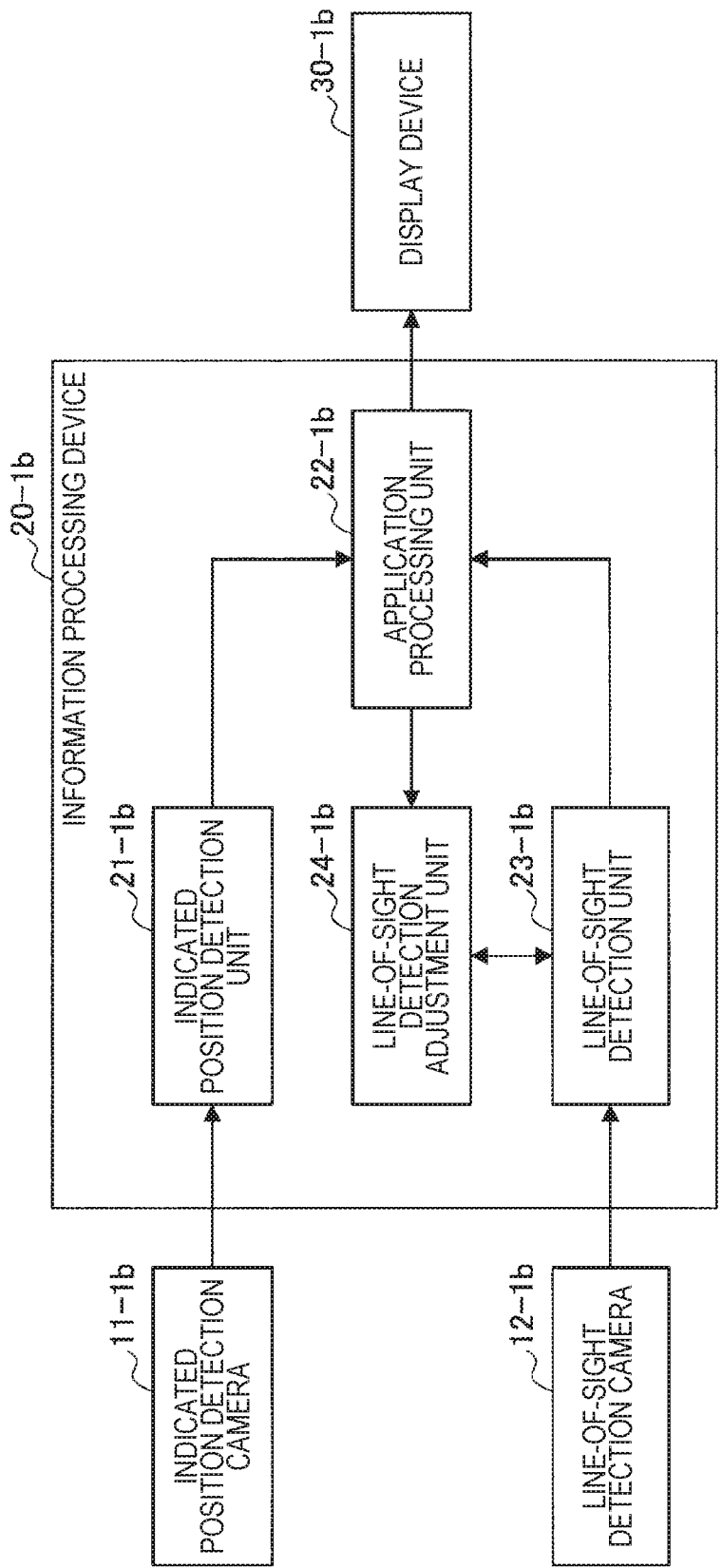
FIG. 3 is a view showing a configuration of another information processing system according to the first embodiment.

FIG. 3 is a view showing a configuration of another information processing system 101b according to the first embodiment. As shown in FIG. 3, the information processing system 101b includes an indicated position detection camera 11-1b, a line-of-sight detection camera 12-1b, an information processing device 20-1b, and a display device 30-1b. As compared with the above-described information processing system 101a, the information processing system 101b is different in that a plurality of cameras are included.

While the above-described information processing system 101a performs detection of an indicated position and line-of-sight detection on the basis of a captured image captured by the single camera 10, the information processing system 101b shown in FIG. 3 is provided with the indicated position detection camera 11-1b and the line-of-sight detection camera 12-1b to perform indicated position detection and line-of-sight detection on the basis of captured images captured by the respective cameras.

In addition, the information processing device 20-1*b* has an indicated position detection unit 21-1*b*, an application processing unit 22-1*b*, a line-of-sight detection unit 23-1*b*, and a line-of-sight detection adjustment unit 24-1*b*, as shown in FIG. 3. Since the main function of each configuration is similar to each configuration of the information processing device 20-1*a* described with reference to FIG. 2, detailed description is omitted here. Moreover, the indicated position detection unit 21-1*b* detects a position indicated by a user on the basis of a captured image obtained from the indicated position detection camera 11-1*b*. Furthermore, the line-of-sight detection unit 23-1*b* detects the line of sight of the user on the basis of a captured image obtained from the line-of-sight detection camera 12-1*b*.

Note that in FIG. 2 and FIG. 3, the camera 10-1*a* or the indicated position detection camera 11-1*b* and the line-of-sight detection camera 12-1*b*, the information processing device 20-1*a*, and the display device 30-1*a* are configured by different members, whilst the present embodiment is not limited to this, and for example, they may be configured by an identical member.

(Operation)

Figure 4:
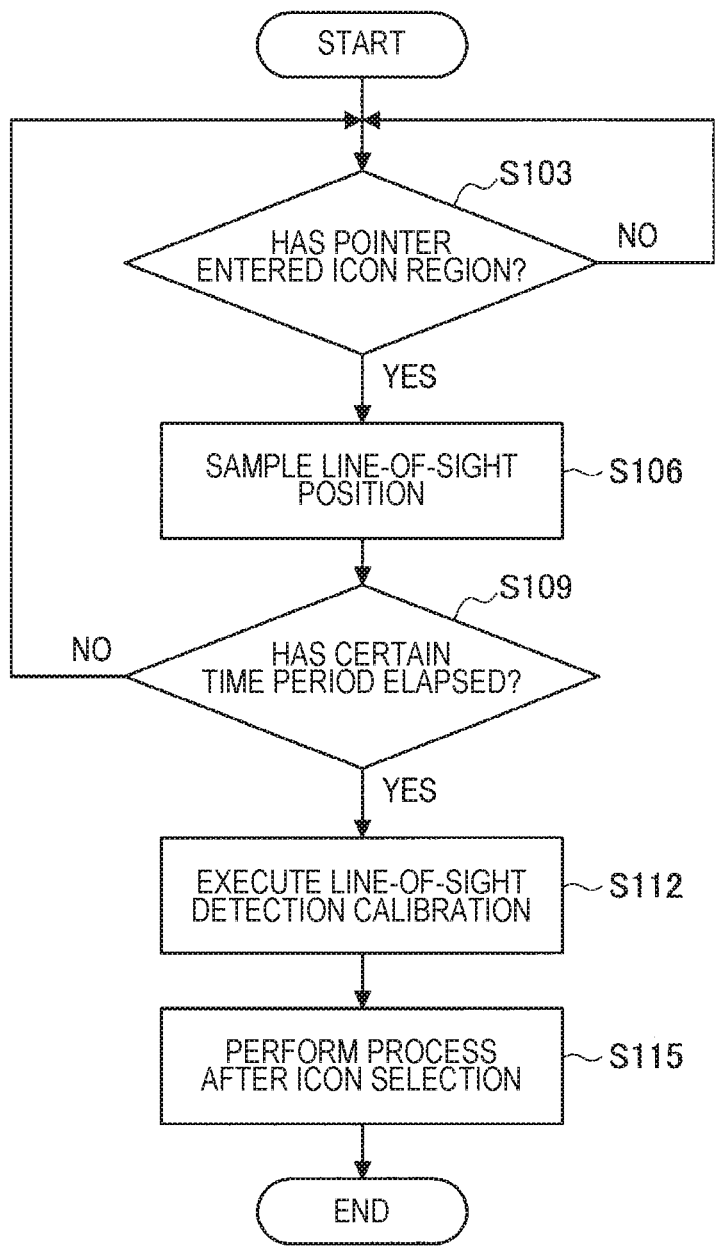
FIG. 4 is a flowchart showing an operational process of line-of-sight detection calibration when the indicator according to the first embodiment is a pointer.

Subsequently, an operational process according to the present embodiment will be described referring to FIG. 4. FIG. 4 is a flowchart showing an operational process of line-of-sight detection calibration when the indicator according to the first embodiment is a pointer. Here, if it is unnecessary to distinguish among the respective configurations shown in FIG. 2 and FIG. 3, an information processing device 20-1 (20-1*a*, 20-1*b*), an indicated position detection unit 21-1 (21-1*a*, 21-1*b*), an application processing unit 22-1 (22-1*a*, 22-1*b*), a line-of-sight detection unit 23-1 (23-1*a*, 23-1*b*), and a line-of-sight detection adjustment unit 24-1 (24-1*a*, 24-1*b*) are designated.

As shown in FIG. 4, first, in step S103, the line-of-sight detection adjustment unit 24-1 determines whether the pointer 50 has entered the display region of an icon which is the target of gaze, for example, the start icon 40, on the basis of information output from the application processing unit 22-1.

Next, if the pointer 50 has entered the display region of the start icon 40 (S103/Yes), the line-of-sight detection unit 23-1 samples the line-of-sight position P in step S106. Note that the line-of-sight detection unit 23-1 continuously samples the line-of-sight positions P, and if the pointer 50 has not entered the display region of the start icon 40 (S103/No), data being sampled may be cleared.

Then, in step S109, the line-of-sight detection adjustment unit 24-1 determines execution of calibration on the basis of whether a certain time period has elapsed after the pointer 50 enters the display region of the start icon 40. At this time, the line-of-sight detection adjustment unit 24-1 may also check that the line-of-sight position P stays within a certain range to determine execution of calibration.

Next, if the pointer 50 has moved out of the display region without a certain time period elapsed after the pointer 50 enters the display region of the start icon 40 (S109/No), sampled data is cleared.

On the other hand, if a certain time period has elapsed after the pointer 50 enters the display region of the start icon 40 (S109/Yes), the line-of-sight detection adjustment unit 24-1 executes line-of-sight detection calibration in step S112. Specifically, the line-of-sight detection adjustment unit 24-1 corrects a line-of-sight detection error on the basis of a displacement between the center position of the display region of the start icon 40 and the sampled line-of-sight position P. This is because it is assumed that, in an operation of causing the pointer 50 to stay within the display region of the start icon 40, the user is gazing at the start icon 40 (the line of sight S).

In addition, the line-of-sight position P may be an average value of a plurality of pieces of sampled line-of-sight position data, or a standard deviation σ of a plurality of pieces of sampled line-of-sight position data may be calculated, and only data within 3σ may be used.

Then, in step S115, the application processing unit 22-1 performs a use start operation corresponding to the start icon 40 selected with the pointer 50 (that is, a process after icon selection). Selection of the start icon 40 is premised on that the pointer 50 remains in the display region of the start icon 40 for a certain time period.

As described above, an information processing system 101 (101*a*, 101*b*) according to the present embodiment can execute line-of-sight detection calibration in an operation for a user to accomplish an original object of a device, that is, an operation of causing the pointer 50 to enter the display region of the start icon 40 for use start, and can eliminate the need for an operation merely for line-of-sight detection calibration.

(2-1-2. Line-of-Sight Detection Calibration when a Controller is Used)

Subsequently, line-of-sight detection calibration when a controller is used as an indicator will be described referring to FIG. 5 to FIG. 6.

(Overview)

Figure 5:
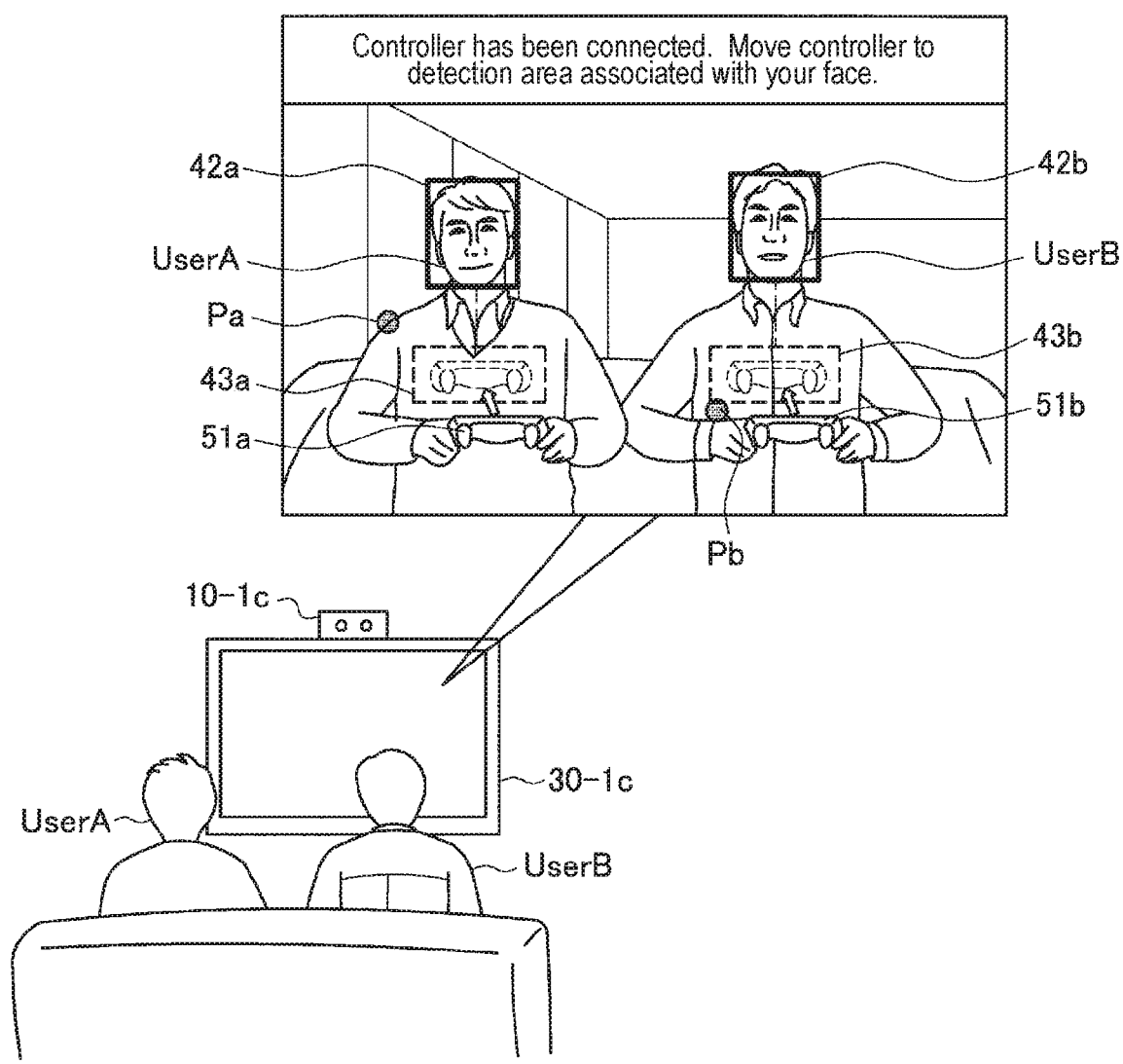
FIG. 5 is a view describing line-of-sight detection calibration when the indicator according to the first embodiment is a controller.

FIG. 5 is a view describing line-of-sight detection calibration when the indicator according to the first embodiment is a controller. Here, as shown in FIG. 5, a system is assumed in which video of a user captured by a camera 10-1*c* is displayed on the display screen of a display device 30-1*c*, and a controller 51 held by the user is moved to a detection area 43 displayed in association with a user face 42 appearing on the screen to perform a login process for the user (if an individual can be identified by face recognition, a login process for the individual). In addition, a process of associating the connected controller 51 with the user having performed a login process is also performed. After the login, an operation in accordance with the line of sight of the user may be carried out.

The detection area 43 corresponds to each user, and when several users A and B appear as shown in FIG. 5, for example, several detection areas 43*a* and 43*b* are displayed in correspondence with faces 42*a* and 42*b* of the respective users. Therefore, the user A moves a controller 51*a* of his/her own to the detection area 43*a* displayed in proximity to his/her face 42*a* to perform login, and the user B also moves a controller 51*b* of his/her own to the detection area 43*b* displayed in proximity to his/her face 42*b* to perform login.

In the present embodiment, line-of-sight detection calibration is executed in an operation of accomplishing an original object of a device which is such a login operation in which the controller 51 is used.

(Configuration)

The configuration of the information processing system according to the present embodiment is similar to the system configurations described above referring to FIG. 2 and FIG. 3. That is, the information processing system 101 according to the present embodiment includes the camera 10-1*c* (or an indicated position detection camera 11-1*c* and a line-of-sight detection camera 12-1*c*), an information processing device 20-1*c*, and the display device 30-1*c*. Similarly to the cases shown in FIG. 2 and FIG. 3, the information processing device 20-1*c* has an indicated position detection unit 21-1*c*, an application processing unit 22-1c, a line-of-sight detection unit 23-1c, and a line-of-sight detection adjustment unit 24-1c.

The indicated position detection unit 21-1c detects the position on the display screen of the controller 51 held by a user, an image of whom has been captured by the camera 10-1c. Moreover, on the basis of the coordinate position of the controller 51 detected by the indicated position detection unit 21-1c, the application processing unit 22-1c executes a login process for a user corresponding to the detection area 43 when the controller 51 enters the detection area 43. Furthermore, the application processing unit 22-1c also serves as a recognition unit that recognizes the coordinate position of the detection area 43 (an example of a target of gaze) on the display screen.

The line-of-sight detection unit 23-1c performs line-of-sight detection on the basis of a captured image of eyes of the user captured by the camera 10-1c (for example, detects a line-of-sight position Pa of the user A and a line-of-sight position Pb of the user B). When the controller 51 enters the detection area 43, the line-of-sight detection adjustment unit 24-1c performs line-of-sight detection calibration on the basis of the line-of-sight positions P sampled continuously from the line-of-sight detection unit 23-1c and the display position of the detection area 43. Specifically, a correction parameter is calculated from a displacement between the detected line-of-sight positions P and the center position of the display region of the detection area 43 to correct a line-of-sight detection error due to individual differences.

(Operation)

Figure 6:
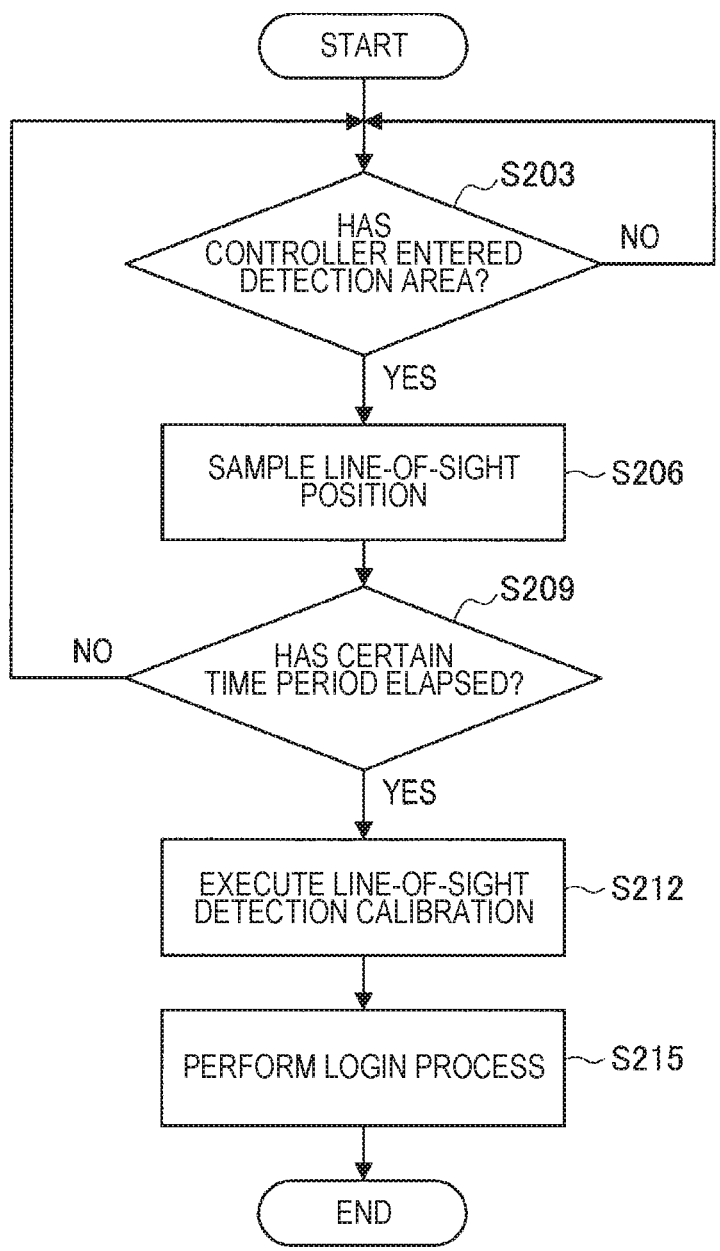
FIG. 6 is a flowchart showing an operational process of line-of-sight detection calibration when the indicator according to the first embodiment is a controller.

FIG. 6 is a flowchart showing an operational process of line-of-sight detection calibration when the indicator according to the first embodiment is a controller. Here, the information processing device 20-1 (20-1c), the indicated position detection unit 21-1 (21-1c), the application processing unit 22-1 (22-1c), the line-of-sight detection unit 23-1 (23-1c), and the line-of-sight detection adjustment unit 24-1 (24-1c) are designated.

As shown in FIG. 6, first, in step S203, the line-of-sight detection adjustment unit 24-1 determines whether the controller 51 has entered the display region of the detection area 43 which is the target of gaze on the basis of information output from the application processing unit 22-1.

Next, if the controller 51 has entered the display region of the detection area 43 (S203/Yes), the line-of-sight detection unit 23-1 samples the line-of-sight position P in step S206. Note that the line-of-sight detection unit 23-1 continuously samples the line-of-sight positions P, and if the controller 51 has not entered the display region of the detection area 43 (S203/No), data being sampled may be cleared.

Then, in step S209, the line-of-sight detection adjustment unit 24-1 determines execution of calibration on the basis of whether a certain time period has elapsed after the controller 51 enters the display region of the detection area 43. At this time, the line-of-sight detection adjustment unit 24-1 may also check that the line-of-sight position P stays within a certain range to determine execution of calibration.

Next, if the controller 51 has moved out of the display region without a certain time period elapsed after the controller 51 enters the display region of the detection area 43 (S209/No), sampled data is cleared.

On the other hand, if a certain time period has elapsed after the controller 51 enters the display region of the detection area 43 (S209/Yes), the line-of-sight detection adjustment unit 24-1 executes line-of-sight detection calibration in step S212. Specifically, the line-of-sight detection adjustment unit 24-1 corrects a line-of-sight detection error on the basis of a displacement between the center position of the display region of the detection area 43 and the sampled line-of-sight position P. This is because it is assumed that, in an operation of causing the controller 51 to stay within the display region of the detection area 43, the user is gazing at the detection area 43.

Then, in step S215, in accordance with a user operation in which the user moves the controller 51 to the detection area 43, the application processing unit 22-1 performs a login process for the user.

As described above, the information processing system 101c according to the present embodiment can execute line-of-sight detection calibration in an operation for a user to accomplish an original object of a device, that is, an operation of moving the controller 51 to the detection area 43 for a login process, and can eliminate the need for an operation merely for line-of-sight detection calibration.

(2-1-3. Line-of-Sight Detection Calibration when a Fingertip is Used)

Next, line-of-sight detection calibration when a fingertip is used as an indicator will be described referring to FIG. 7 to FIG. 8.

(Overview)

Figure 7:
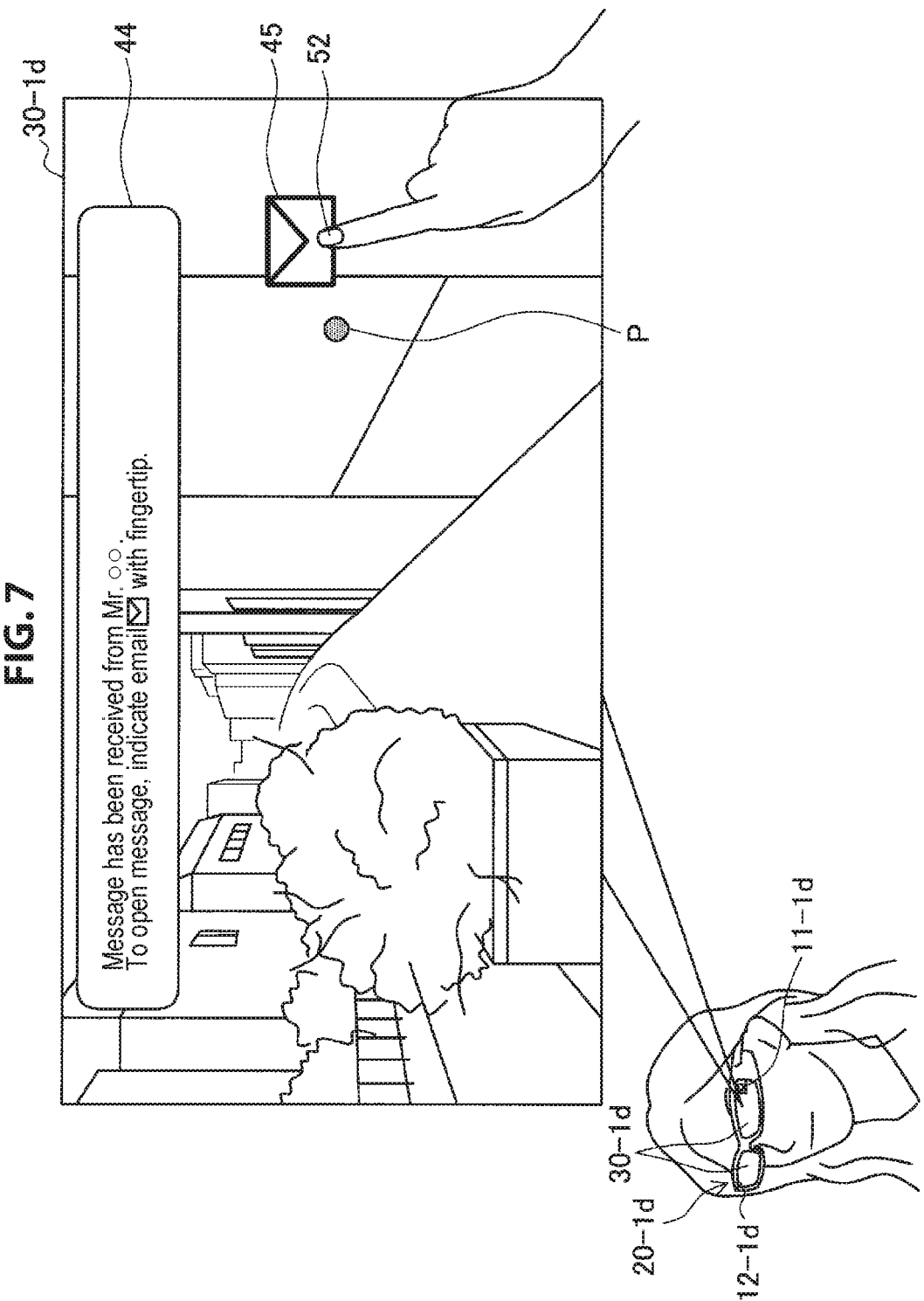
FIG. 7 is a view describing line-of-sight detection calibration when the indicator according to the first embodiment is a fingertip.

FIG. 7 is a view describing line-of-sight detection calibration when the indicator according to the first embodiment is a fingertip. Here, as shown in FIG. 7, a system is assumed in which when a user wears an information processing device 20-1d implemented by a smart eyeglass, text, icon, and the like are displayed on a display device 30-1d located in front of the eyes of the user, and the user can make a selection by raising a fingertip forward to be located at the display position of an icon. In addition, the information processing device 20-1d can also detect the line of sight of the user and exert control in accordance with the line of sight.

The position of the fingertip is detected on the basis of a captured image captured by an indicated position detection camera 11-1d provided outwardly in the information processing device 20-1d, as shown in FIG. 7. In addition, the line of sight of a wearer (user) is detected on the basis of a captured image captured by a line-of-sight detection camera 12-1d provided inwardly in the information processing device 20-1d, as shown in FIG. 7.

The display device 30-1d is transmissive, and the user wearing the information processing device 20-1d can visually recognize a real space via the display device 30-1d as shown in FIG. 7. Moreover, in the example shown in FIG. 7, text 44 reading that "Message has been received from Mr. ○○. To open message, indicate email icon with fingertip." and an email icon 45 are displayed on the display device 30-1d. In this case, the user makes a gesture of raising a fingertip 52 in front of his/her eyes to indicate the email icon 45 displayed on the display device 30-1d. An image of the position of the fingertip 52 is captured by the indicated position detection camera 11-1d provided outwardly in the information processing device 20-1d, and is detected by the information processing device 20-1d. When the position of the fingertip 52 in the field of view of the user detected on the basis of the captured image is present within the display region of the email icon 45a, the information processing device 20-1d determines that the email icon 45 has been selected, and displays the contents of email on the display device 30-1d.

In the present embodiment, line-of-sight detection calibration is executed in an operation of accomplishing an original object of a device which is such an operation of selecting an icon with the fingertip 52.

(Configuration)

The configuration of the information processing system according to the present embodiment is similar to the system configuration described above referring to FIG. 3. That is, the information processing system 101d according to the present embodiment includes the indicated position detection camera 11-1d, the line-of-sight detection camera 12-1d, the information processing device 20-1d, and the display device 30-1d. Similarly to the case shown in FIG. 3, the information processing device 20-1d has an indicated position detection unit 21-1d, an application processing unit 22-1d, a line-of-sight detection unit 23-1d, and a line-of-sight detection adjustment unit 24-1d.

The indicated position detection unit 21-1d detects the position of the fingertip 52 of the user (the coordinate position on the transmissive display device 30-1d) on the basis of a captured image captured by the indicated position detection camera 11-1d. Moreover, on the basis of the coordinate position of the fingertip 52 detected by the indicated position detection unit 21-1d, the application processing unit 22-1d executes a process of displaying the contents of email corresponding to the email icon 45 on the display device 30-1d when the fingertip 52 indicates the email icon 45. Furthermore, the application processing unit 22-1d also serves as a recognition unit that recognizes the coordinate position of the email icon 45 (an example of a target of gaze) on the display screen.

The line-of-sight detection unit 23-1d performs line-of-sight detection on the basis of a captured image of the eyes of the user captured by the line-of-sight detection camera 12-1d. When the fingertip 52 indicates the email icon 45, the line-of-sight detection adjustment unit 24-1d performs line-of-sight detection calibration on the basis of the line-of-sight positions P sampled continuously from the line-of-sight detection unit 23-1d and the display position of the email icon 45. Specifically, a correction parameter is calculated from a displacement between the detected line-of-sight positions P and the center position of the display region of the email icon 45 to correct a line-of-sight detection error due to individual differences.

(Operation)

Figure 8:
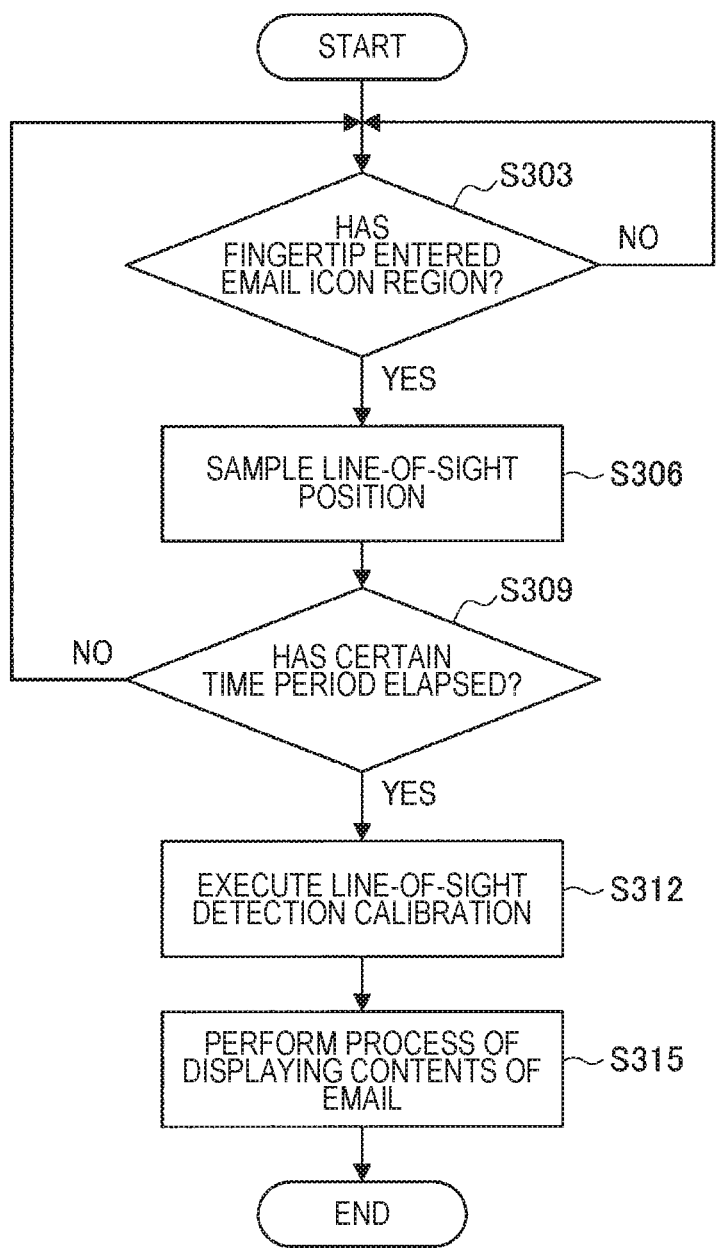
FIG. 8 is a flowchart showing an operational process of line-of-sight detection calibration when the indicator according to the first embodiment is a fingertip.

FIG. 8 is a flowchart showing an operational process of line-of-sight detection calibration when the indicator according to the first embodiment is a fingertip. Here, the information processing device 20-1 (20-1d), the indicated position detection unit 21-1 (21-1d), the application processing unit 22-1 (22-1d), the line-of-sight detection unit 23-1 (23-1d), and the line-of-sight detection adjustment unit 24-1 (24-1d) are designated.

As shown in FIG. 8, first, in step S303, the line-of-sight detection adjustment unit 24-1 determines whether the fingertip 52 has entered the display region of the email icon 45 which is the target of gaze on the basis of information output from the application processing unit 22-1.

Next, if the fingertip 52 has entered the display region of the email icon 45 (S303/Yes), the line-of-sight detection unit 23-1 samples the line-of-sight position P in step S306. Note that the line-of-sight detection unit 23-1 continuously samples the line-of-sight positions P, and if the fingertip 52 has not entered the display region of the email icon 45 (S303/No), data being sampled may be cleared.

Then, in step S309, the line-of-sight detection adjustment unit 24-1 determines execution of calibration on the basis of whether a certain time period has elapsed after the fingertip 52 enters the display region of the email icon 45. At this time, the line-of-sight detection adjustment unit 24-1 may also check that the line-of-sight position P stays within a certain range to determine execution of calibration.

Next, if the fingertip 52 has moved out of the display region without a certain time period elapsed after the fingertip 52 enters the display region of the email icon 45 (S309/No), sampled data is cleared.

On the other hand, if a certain time period has elapsed after the fingertip 52 enters the display region of the email icon 45 (S309/Yes), the line-of-sight detection adjustment unit 24-1 executes line-of-sight detection calibration in step S312. Specifically, the line-of-sight detection adjustment unit 24-1 corrects a line-of-sight detection error on the basis of a displacement between the center position of the display region of the email icon 45 and the sampled line-of-sight position P. This is because it is assumed that, in an operation of causing the fingertip 52 to stay within the display region of the email icon 45, the user is gazing at the email icon 45.

Then, in step S315, in accordance with a user operation in which the user indicates the email icon 45 with the fingertip 52, the application processing unit 22-1 performs a process of displaying the contents of email corresponding to the email icon 45.

As described above, the information processing system 101d according to the present embodiment can execute line-of-sight detection calibration in an operation for a user to accomplish an original object of a device, that is, an operation of moving the fingertip 52 to the display region of an icon for selecting the icon, and can eliminate the need for an operation merely for line-of-sight detection calibration.

In addition, in the above-described first embodiment, line-of-sight calibration can also be performed repeatedly to increase stepwise the accuracy of calibration. For example, the display position of a target of gaze (for example, the start icon 40, the detection area 43, the email icon 45) is located at a different position each time to gradually cover the whole display region.

2-2. Second Embodiment

Subsequently, an information processing system 102 according to a second embodiment will be specifically described referring to FIG. 9 to FIG. 12. In the above-described first embodiment, the target of gaze is an object displayed on the display screen (a virtual object), whilst the present disclosure is not limited to this, and the target of gaze may be a real object.

(Overview)

Figure 9:
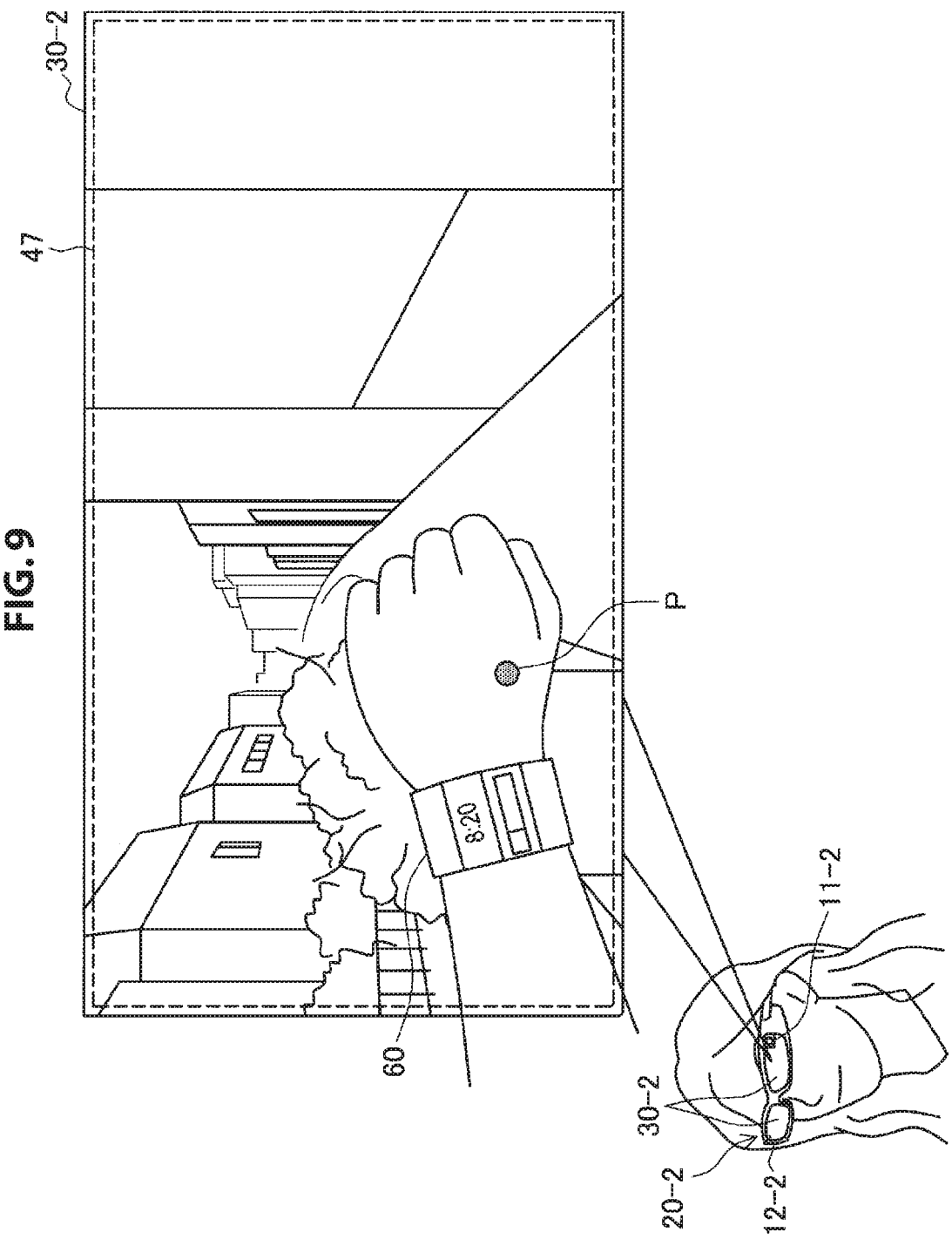
FIG. 9 is a view describing line-of-sight detection calibration when a target of gaze according to a second embodiment is a real object.

FIG. 9 is a view describing line-of-sight detection calibration when a target of gaze according to the second embodiment is a real object. Here, as shown in FIG. 9, a system is assumed in which when a user wears an information processing device 20-2 implemented by a smart eyeglass, text, icon, and the like are displayed on a display device 30-2 located in front of the eyes of the user, and control in accordance with the line of sight of the user can be exerted.

The display device 30-2 is transmissive, and the user wearing the information processing device 20-1d can visually recognize a real space via the display device 30-2 as shown in FIG. 9. Therefore, the user can move a device 60 (a real object), such as a smart watch or a smart band being worn, or a smartphone being held, in front of his/her eyes (within a field of view 47) to have a look. At this time, since it is assumed that the line of sight of the user is directed to the device 60, the information processing device 20-2 performs line-of-sight detection calibration on the basis of the position of the device 60 and the line-of-sight position P detected at that time.

In the present embodiment, line-of-sight detection calibration is executed in an operation of accomplishing an original object of a device of moving a device in front of eyes in this manner for visual recognition.

(Configuration)

Figure 10:
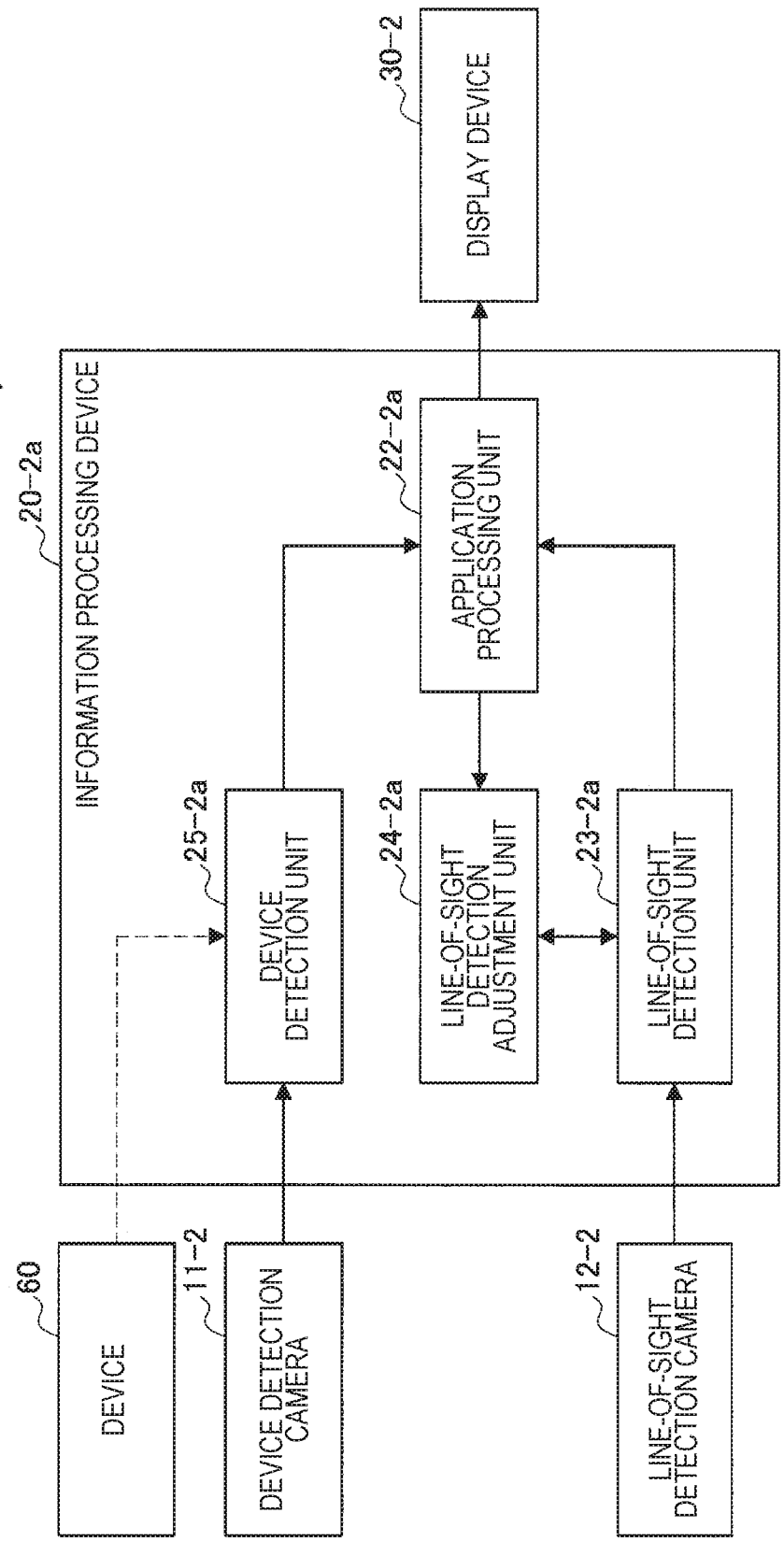
FIG. 10 is a view showing a configuration of an information processing system according to the second embodiment.

FIG. 10 is a view showing a configuration of an information processing system 102*a* according to the second embodiment. As shown in FIG. 10, the information processing system 102*a* includes the device 60, a device detection camera 11-2, a line-of-sight detection camera 12-2, an information processing device 20-2*a*, and the display device 30-2.

The device 60 is implemented by, for example, a smart watch, a smart band, a smartphone, or the like, as described above.

The device detection camera 11-2 is provided outwardly in the information processing device 20-2, and captures an image of the field of view of a user. The captured image is used for detecting the device 60. Moreover, the line-of-sight detection camera 12-2 is provided inwardly in the information processing device 20-2, and captures an image of eyes of the user. The captured image is used for line-of-sight detection.

Furthermore, the information processing device 20-2*a* includes an application processing unit 22-2*a*, a line-of-sight detection unit 23-2*a*, a line-of-sight detection adjustment unit 24-2*a*, and a device detection unit 25-2*a*, as shown in FIG. 10.

The device detection unit 21-2*a* detects the device 60 having entered the field of view 47 of the user on the basis of the captured image captured by the device detection camera 11-2. The device detection unit 21-2*a* can also receive model information from the device 60 to recognize the presence of the device 60 held by the user.

The application processing unit 22-2*a* may execute predetermined control (an application process) corresponding to the device 60 detected by the device detection unit 25-2*a*. The application processing unit 22-2*a* may also serve as a recognition unit that recognizes the coordinate position of the device 60 (an example of a target of gaze) on the display device 30-2 corresponding to the region of the field of view 47 of the user. At this time, the application processing unit 22-2*a* recognizes the coordinate position of the device 60 (an example of a target of gaze) on the display device 30-2 on the basis of the detection result of the device 60 and the captured image output from the device detection unit 25-2*a*.

The line-of-sight detection unit 23-2*a* performs line-of-sight detection on the basis of the captured image of eyes of the user captured by the line-of-sight detection camera 12-2. When the device 60 is present within the field of view 47, the line-of-sight detection adjustment unit 24-2*a* performs line-of-sight detection calibration on the basis of the line-of-sight positions P sampled continuously from the line-of-sight detection unit 23-2*a* and the position of the device 60 recognized by the application processing unit 22-2*b*. Specifically, a correction parameter is calculated from a displacement between the detected line-of-sight positions P and the center position of the object region of the device 60 to correct a line-of-sight detection error due to individual differences.

The configuration of the information processing system 102*a* according to the present embodiment has been specifically described above. Note that the system configuration shown in FIG. 10 is an example, and the present embodiment is not limited to this. For example, in the information processing system 102*a* shown in FIG. 10, line-of-sight detection calibration performed by the line-of-sight detection adjustment unit 24-2*a* and an application process performed by the application processing unit 22-2*a* are in synchronization. That is, some application process is performed in the information processing device 20-2*a* in accordance with an action of a user visually recognizing the device 60, and line-of-sight detection calibration is also performed. However, the present embodiment is not limited to this, and the application process and the line-of-sight detection calibration may be asynchronous. Hereinafter, a system configuration in the asynchronous case will be described referring to FIG. 11.

Figure 11:
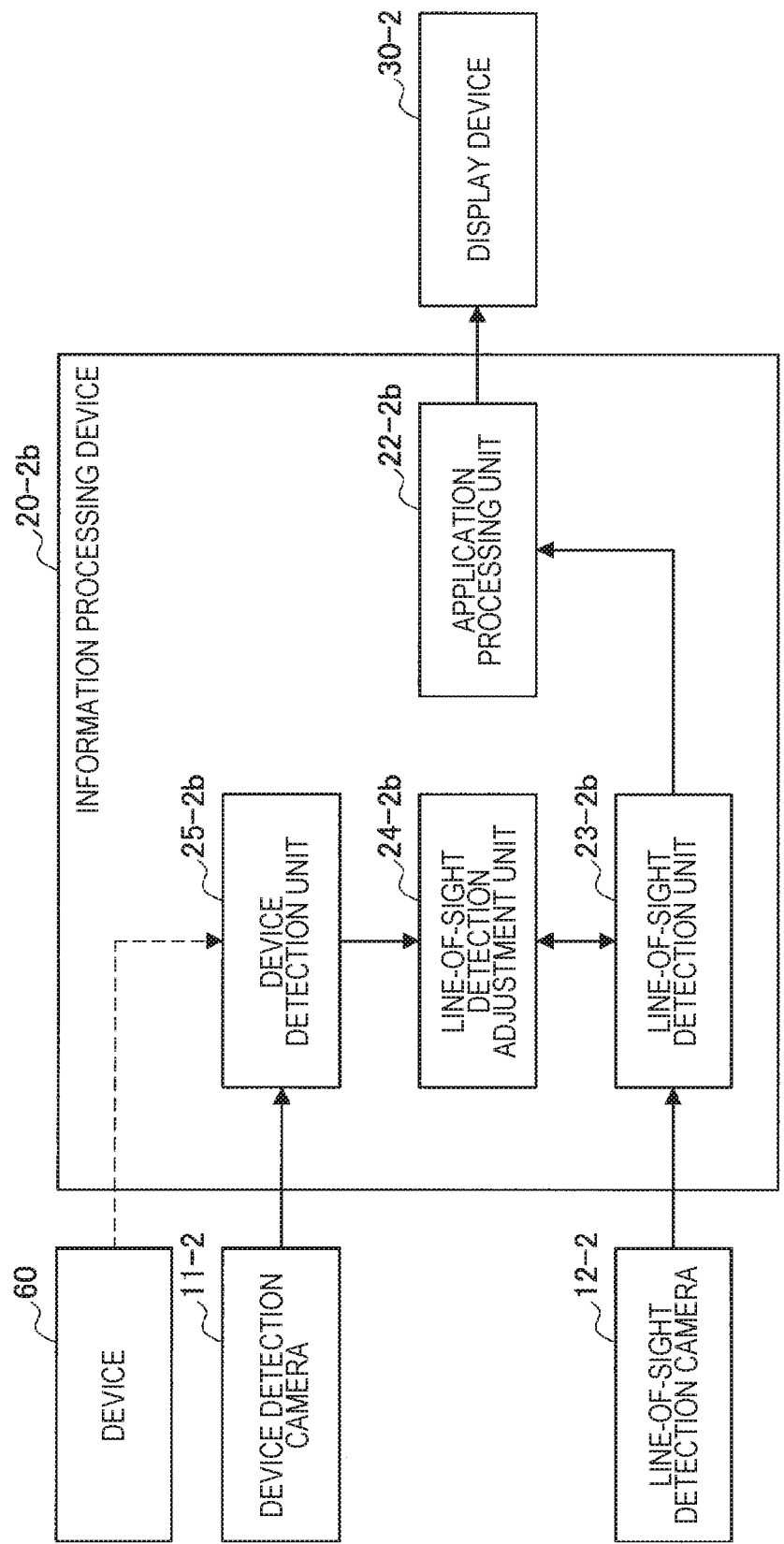
FIG. 11 is a view showing a configuration of another information processing system according to the second embodiment.

FIG. 11 is a view showing a configuration of another information processing system 102*b* according to the second embodiment. As shown in FIG. 11, the information processing system 102*b* includes the device 60, the device detection camera 11-2, the line-of-sight detection camera 12-2, an information processing device 20-2*b*, and the display device 30-2.

As shown in FIG. 11, the information processing device 20-2*b* includes an application processing unit 22-2*b*, a line-of-sight detection unit 23-2*b*, a line-of-sight detection adjustment unit 24-2*b*, and a device detection unit 25-2*b*. The device detection unit 25-2*b* detects the device 60 of a user present within the field of view 47 on the basis of a captured image captured by the device detection camera 11-2, and also serves as a recognition unit that recognizes the coordinate position of the device 60 (an example of a target of gaze) on the transmissive display device 30-2. Then, the device detection unit 25-2*b* outputs the coordinate position of the device 60 to the line-of-sight detection adjustment unit 24-2*b*, unlike the device detection unit 25-2*a*.

The line-of-sight detection adjustment unit 24-2*b* performs line-of-sight detection calibration on the basis of the line-of-sight positions P sampled continuously from the line-of-sight detection unit 23-2*a* and the position of the device 60 recognized by the device detection unit 25-2*b*.

In this manner, the information processing system 102*b* performs line-of-sight detection calibration in accordance with an action of a user visually recognizing the device 60 asynchronously with the application process in the application processing unit 22-2*b*.

(Operation)

Figure 12:
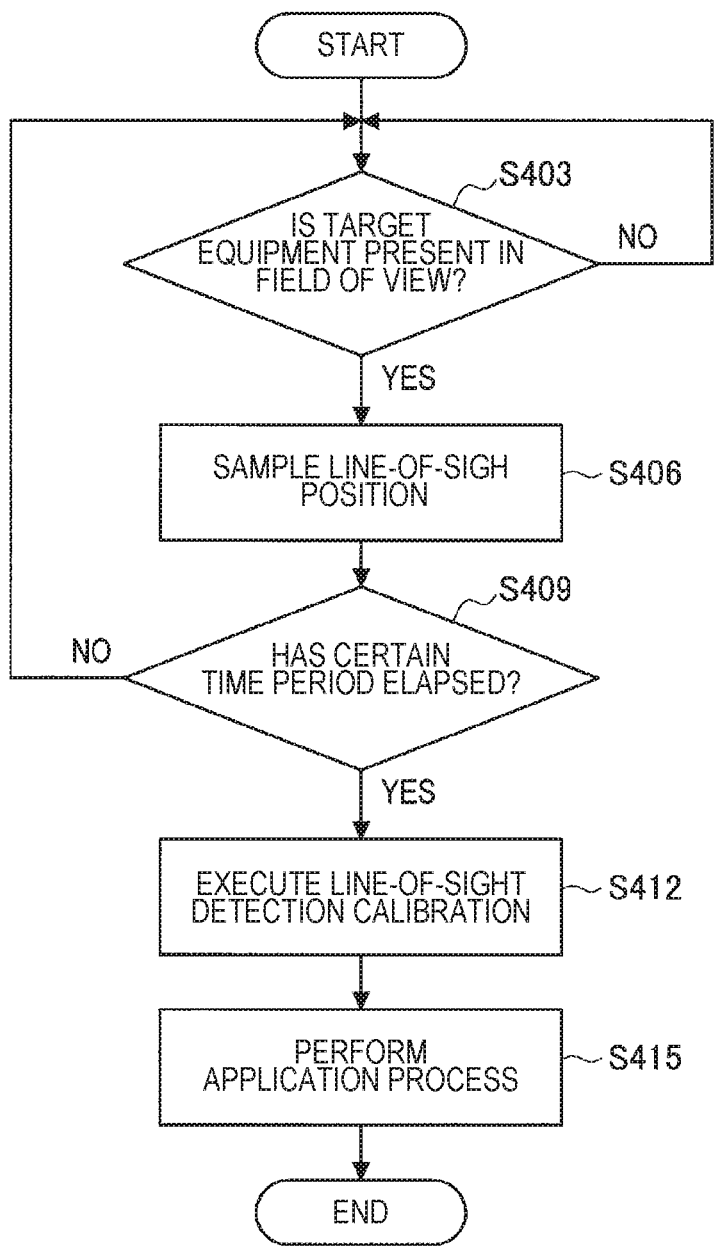
FIG. 12 is a flowchart showing an operational process of line-of-sight detection calibration according to the second embodiment.

Subsequently, an operational process according to the present embodiment will be described referring to FIG. 12. FIG. 12 is a flowchart showing an operational process of line-of-sight detection calibration according to the second embodiment. Here, if it is unnecessary to distinguish between the respective configurations shown in FIG. 10 and FIG. 11, the information processing device 20-2 (20-2*a*, 20-2*b*), an application processing unit 22-2 (22-2*a*, 22-2*b*), a line-of-sight detection unit 23-2 (23-2*a*, 23-2*b*), a line-of-sight detection adjustment unit 24-2 (24-2*a*, 24-2*b*), and a device detection unit 25-2 (25-2*a*, 25-2*b*) are designated.

As shown in FIG. 12, first, in step S403, the line-of-sight detection adjustment unit 24-2 determines whether the device 60 which is the target of gaze is present within the field of view 47. Specifically, the line-of-sight detection adjustment unit 24-2 determines that the device 60 is present within the field of view 47 when the device 60 is detected by the device detection unit 25-2 on the basis of a captured image captured by the device detection camera 11-2 that captures an image of the field of view of the user.

Next, if it is determined that the device 60 is present within the field of view 47 of the user (S403/Yes), the line-of-sight detection unit 23-2 samples the line-of-sight position P in step S406 on the basis of a captured image captured by the line-of-sight detection camera 12-2. Note that the line-of-sight detection unit 23-2 continuously samples the line-of-sight positions P, and if the device 60 is not present within the field of view 47 (S403/No), data being sampled may be cleared.

Then, in step S409, the line-of-sight detection adjustment unit 24-2 determines execution of calibration on the basis of whether a certain time period has elapsed after the device 60 enters the field of view 47. At this time, the line-of-sight detection adjustment unit 24-2 may also check that the line-of-sight position P stays within a certain range to determine execution of calibration.

Next, if the device 60 falls outside the field of view 47 without a certain time period elapsed after the device 60 enters the field of view 47 (S409/No), sampled data is cleared.

On the other hand, if a certain time period has elapsed after the device 60 enters the field of view 47 (S409/Yes), the line-of-sight detection adjustment unit 24-2 executes line-of-sight detection calibration in step S412. Specifically, the line-of-sight detection adjustment unit 24-2 corrects a line-of-sight detection error on the basis of a displacement between the center position of the object region of the device 60 and the sampled line-of-sight position P. This is because it is assumed that, in an action of moving the device 60 in front of the eyes to enter the field of view 47, the user is gazing at the device 60.

In addition, the line-of-sight position P may be an average value of a plurality of pieces of sampled line-of-sight position data, or a standard deviation σ of a plurality of pieces of sampled line-of-sight position data may be calculated, and only data within −2σ may be used.

Then, in step S415, the application processing unit 22-2 performs a predetermined application process in accordance with an action in which the device 60 enters the field of view 47 and the user is visually recognizing the device 60. Note that the process in the S415 is not performed when the line-of-sight detection calibration and the application process are asynchronous (in the case of the information processing system 102b shown in FIG. 11).

As described above, the information processing system 102 (102a, 102b) according to the present embodiment can execute line-of-sight detection calibration in a normal action of a user visually recognizing the device 60, and can eliminate the need for an operation merely for line-of-sight detection calibration.

2-3. Third Embodiment

Next, an information processing device 20-3 according to a third embodiment will be specifically described referring to FIG. 13 to FIG. 16. In the present embodiment, a case of performing line-of-sight detection calibration in an operation of accomplishing an original object of a device which is a button operation when cancelling a passcode displayed on a display screen will be described.

(Overview)

Figure 13:
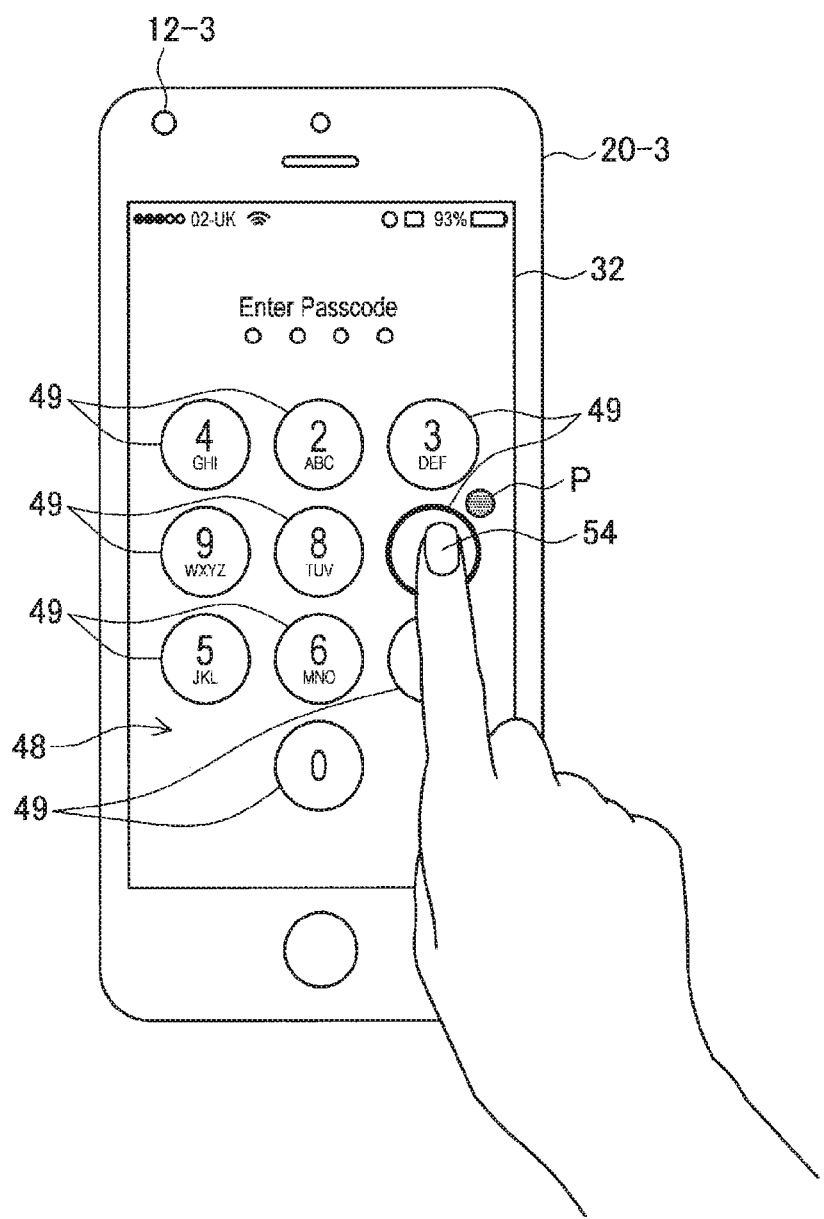
FIG. 13 is a view describing line-of-sight detection calibration according to a third embodiment.

FIG. 13 is a view describing line-of-sight detection calibration according to the third embodiment. Here, as shown in FIG. 13, a system is assumed in which, on a passcode screen 48 displayed on a touch panel display 32 of the information processing device 20-3 implemented by, for example, a smartphone, a user performs a touch operation (selection operation) for passcode cancellation with a finger 54, and when the entered passcode is correct, lock release is performed.

The passcode screen 48 includes number buttons 49 of 0 to 9 as shown in FIG. 13, and a user sequentially touches the plurality of number buttons 49 with the finger 54 while checking the numbers to enter a passcode. Here, since it is assumed that the user is visually recognizing the number buttons 49 (an example of a target of gaze) when touching the number buttons 49, the information processing device 20-3 can perform line-of-sight detection calibration on the basis of the display position of a touched number button 49 and the detected line-of-sight position P.

In the present embodiment, line-of-sight detection calibration is executed in an operation of accomplishing an original object of a device of entering a passcode for releasing a lock in this manner.

(Configuration)

Figure 14:
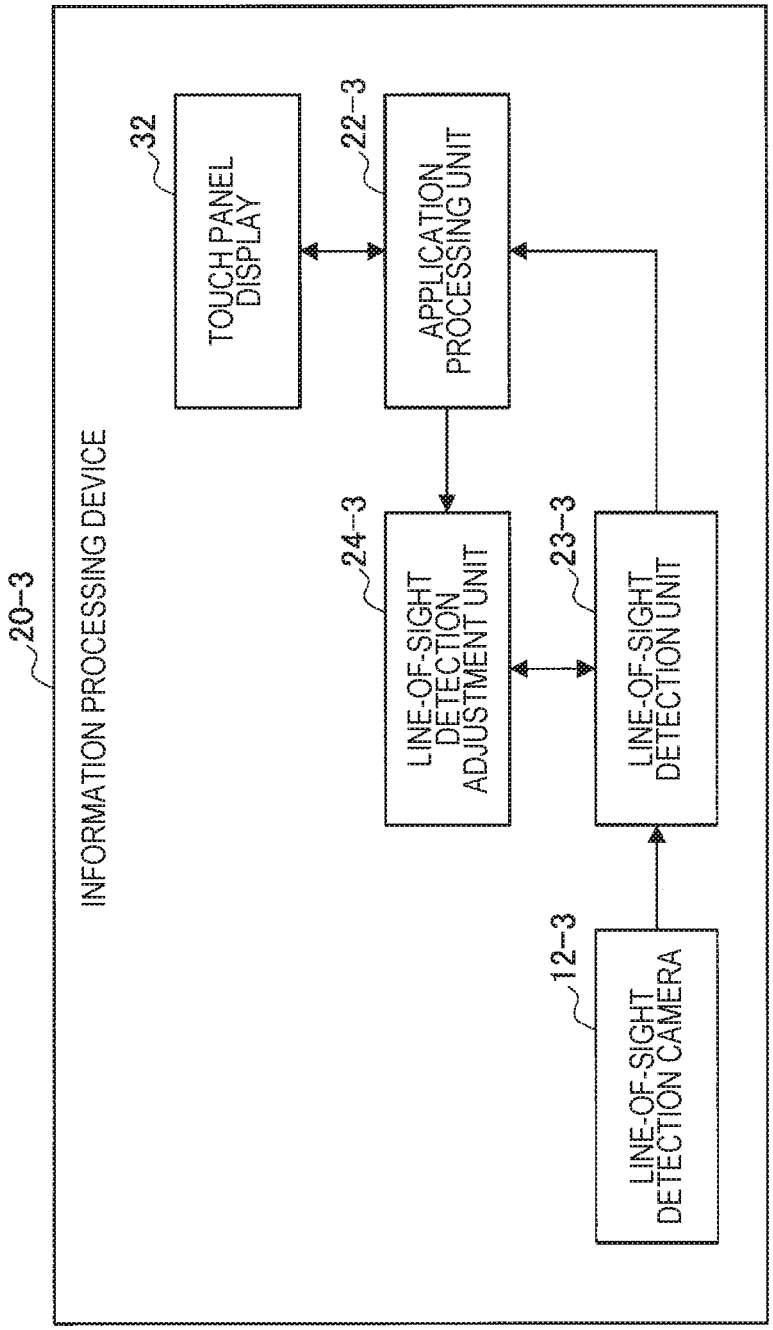
FIG. 14 is a view showing a configuration of another information processing system according to the third embodiment.

FIG. 14 is a view showing a configuration of the information processing device 20-3 according to the third embodiment. As shown in FIG. 14, the information processing device 20-3 includes a line-of-sight detection camera 12-3, an application processing unit 22-3, a line-of-sight detection unit 23-3, a line-of-sight detection adjustment unit 24-3, and the touch panel display 32. Note that the information processing device 20-3 may be implemented by a tablet terminal, a smart watch, or the like, besides the smartphone as shown in FIG. 13.

The line-of-sight detection camera 12-3 is provided on a surface of the information processing device 20-3 on which the touch panel display 32 is provided, and captures an image of a user performing an operation input on the touch panel display 32.

The application processing unit 22-3 performs various processes in accordance with the operation input made by the user through the touch panel display 32. For example, the application processing unit 22-3 performs display control on the touch panel display 32 or control on a music application, a game application, the Internet communications, and the like. Moreover, the application processing unit 22-3 checks the passcode entered through the touch panel display 32, and if it is correct, performs lock release control, and if it is incorrect, provides an error display. Furthermore, the application processing unit 22-3 serves as a recognition unit that recognizes the coordinate position of the number buttons 49 (an example of a target of gaze) displayed on the touch panel display 32.

Note that a passcode is entered by the number buttons 49 in the present embodiment, whilst the present embodiment is not limited to this, and, for example, a passcode may be entered by character buttons, or a pattern input or the like may be adopted.

The line-of-sight detection unit 23-3 performs line-of-sight detection on the basis of a captured image of the eyes of a user captured by the line-of-sight detection camera 12-3. The line-of-sight detection adjustment unit 24-3 performs line-of-sight detection calibration when the application processing unit 22-3 is accepting a passcode input (that is, when the user the user is performing an operation of entering a passcode through the touch panel display 32). Specifically, the line-of-sight detection adjustment unit 24-3 calculates a correction parameter from a displacement between the line-of-sight positions P sampled continuously from the line-of-sight detection unit 23-3 and the center position of the display region of the number buttons 49 (an example of a target of gaze) being touched by the user recognized by the application processing unit 22-3 to correct a line-of-sight detection error due to individual differences.

The touch panel display 32 has a display function and an operation input function, and accepts an operation input on the display screen. Here, the touch panel display 32 is used as an example, whilst the present embodiment is not limited to this, and any display input unit that accepts an operation input on the display screen may be used.

(Operation)

Figure 15:
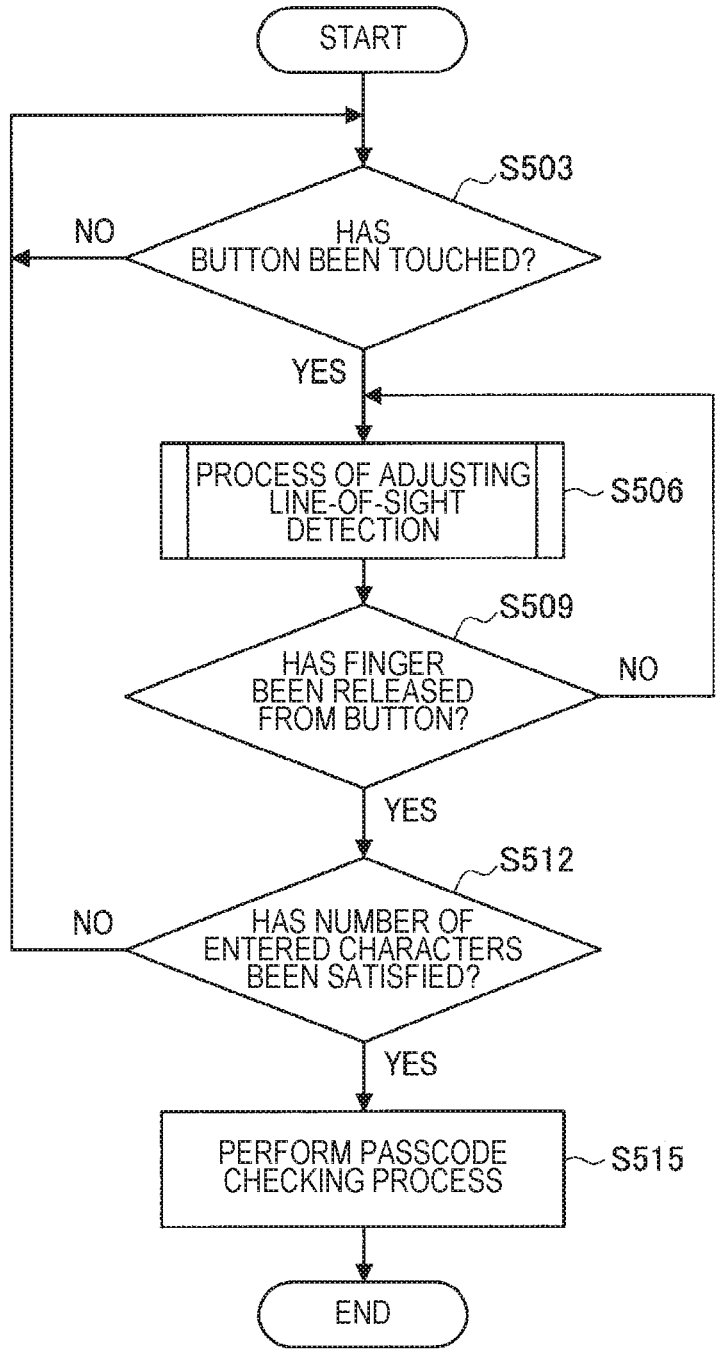
FIG. 15 is a flowchart showing a passcode cancelling process according to the third embodiment.

Subsequently, an operational process according to the present embodiment will be described referring to FIG. 15 and FIG. 16. FIG. 15 is a flowchart showing a passcode cancelling process according to the third embodiment.

As shown in FIG. 15, first, in step S503, the line-of-sight detection adjustment unit 24-3 determines whether the number button 49 which is the target of gaze has been touched. Specifically, the line-of-sight detection adjustment unit 24-3 determines that the number button 49 displayed on the touch panel display 32 has been touched (selected) in accordance with a notice from the application processing unit 22-3.

Next, if it is determined that the number button 49 has been touched (S503/Yes), the line-of-sight detection adjustment unit 24-3 performs a process of adjusting line-of-sight detection in step S506. The process of adjusting line-of-sight detection by the line-of-sight detection adjustment unit 24-3 will be described later referring to FIG. 16.

Then, in step S509, the line-of-sight detection adjustment unit 24-3 determines whether the finger 54 has been released from the number button 49.

Next, if the finger 54 has been released from the number button 49 (S509/Yes), the application processing unit 22-3 determines in step S512 whether the number of entered characters of a passcode has been satisfied. Until the number of entered characters is satisfied, S503 to S509 described above are repeated (S512/No).

Then, if the number of entered characters of a passcode has been satisfied (S512/Yes), the application processing unit 22-3 checks the entered passcode in step S515, and if it is correct, releases a lock, and if it is incorrect, provides an error display.

Subsequently, the process of adjusting line-of-sight detection shown in S506 described above will be described referring to FIG. 16. FIG. 16 is a flowchart showing an operational process of line-of-sight detection calibration performed in the passcode cancelling process shown in FIG. 15.

Figure 16:
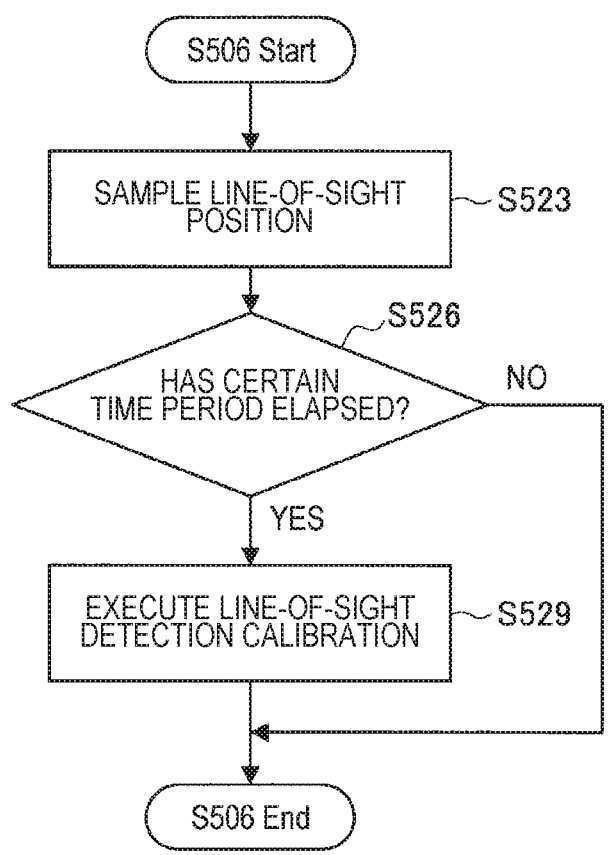
FIG. 16 is a flowchart showing an operational process of line-of-sight detection calibration performed during the passcode cancelling process shown in FIG. 15.

As shown in FIG. 16, in step S523, the line-of-sight detection unit 23-3 samples the line-of-sight position P.

Next, in step S526, the line-of-sight detection adjustment unit 24-3 determines execution of calibration on the basis of whether the time for touching the number button 49 has exceeded a certain time period. At this time, the line-of-sight detection adjustment unit 24-3 may also check that the line-of-sight position P stays within a certain range to determine execution of calibration.

Then, if the finger 54 is released from the number button 49 without a certain time period elapsed (S526/No), sampled data is cleared.

On the other hand, if a certain time period has elapsed (S526/Yes), the line-of-sight detection adjustment unit 24-3 executes line-of-sight detection calibration in step S529. Specifically, the line-of-sight detection adjustment unit 24-3 corrects a line-of-sight detection error on the basis of a displacement between the center position of the display region of the number button 49 touched with the finger 54 and the sampled line-of-sight position P. This is because it is assumed that, in an operation of entering a passcode, the user is gazing at the number button 49.

Here, the line-of-sight position P may be an average value of a plurality of pieces of sampled line-of-sight position data, or a standard deviation σ of a plurality of pieces of sampled line-of-sight position data may be calculated, and only data within −2σ may be used.

As described above, the information processing device 20-3 according to the present embodiment can execute line-of-sight detection calibration in an operation in which a user enters a passcode, and can eliminate the need for an operation merely for line-of-sight detection calibration.

In addition, the above-described line-of-sight calibration according to the third embodiment can also be performed repeatedly to increase stepwise the accuracy of calibration. For example, by setting the display position (key arrangement) of the plurality of number buttons 49 as the target of gaze at a different position at random each time so that a correct passcode cannot be entered unless a user visually recognizes the number buttons 49, and the whole display region is gradually covered.

2-4. Fourth Embodiment

Figure 18:
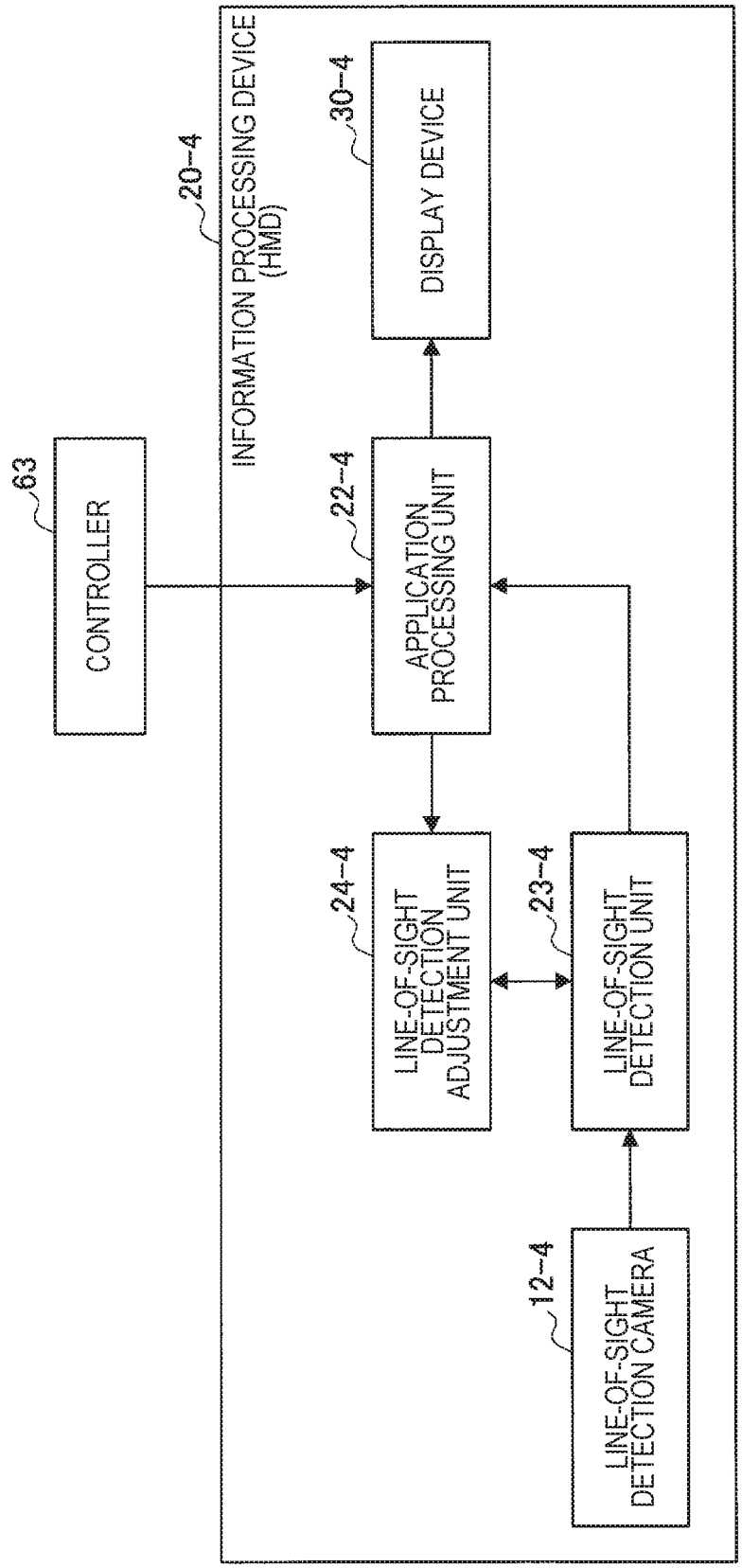
FIG. 18 is a view showing a configuration of an information processing system according to the fourth embodiment.
Figure 19:
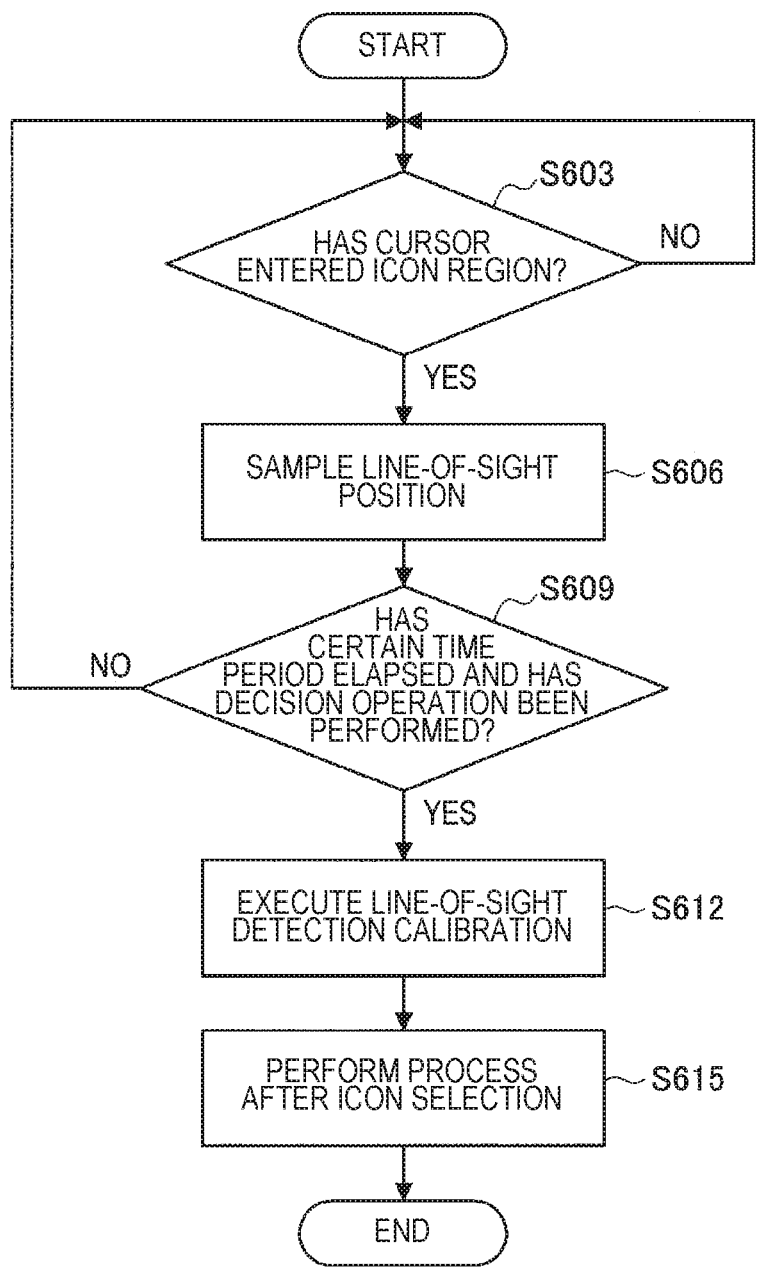
FIG. 19 is a flowchart showing an operational process of line-of-sight detection calibration according to the fourth embodiment.

Next, an information processing system 104 according to a fourth embodiment will be specifically described referring to FIG. 17 to FIG. 19. In the present embodiment, a case of performing line-of-sight detection calibration in an operation of accomplishing an original object of a device, such as selecting, with a controller connected to a head mounted display (HMD) which is a head mounted type display device, any of a plurality of icons displayed on a display unit of the HMD will be described.

(Overview)

FIG. 17 is a view describing line-of-sight detection calibration according to the fourth embodiment. Here, as shown in FIG. 17, a system is assumed in which, from among a plurality of icons 70-1 to 70-n displayed on a display unit 30-4 of an information processing device 20-4 implemented by a HMD, for example, a user performs an operation of selecting an icon 70 using a controller 63 connected to the information processing device 20-4, and an application process corresponding to the selected icon 70 is performed.

The display unit 30-4 is located in front of the eyes when the user wears the information processing device 20-4. In addition, the plurality of icons 70-1 to 70-n and a cursor 72 (an example of an operation target object) moving on the screen in correspondence with the motion of the controller 63 are displayed on a selection screen displayed on the display unit 30-4, as shown in FIG. 17, for example. An acceleration sensor or a gyro sensor, for example, is mounted on the controller 63, and the motion of the controller 63 is output to the information processing device 20-4. By pulling a physical trigger provided for the controller 63 (a shooting controller as shown in FIG. 17, for example) with the cursor 72 placed on any icon 70, the user can select the icon 70. Here, since it is assumed that the user is visually recognizing the icon 70 (an example of a target of gaze) when the user selects the icon 70, the information processing device 20-4 can perform line-of-sight detection calibration on the basis of the display position of the selected icon 70 and the detected line-of-sight position P.

In the present embodiment, line-of-sight detection calibration is executed in an operation of accomplishing an original object of a device of selecting an icon on the screen in this manner.

(Configuration)

FIG. 18 is a view showing a configuration of the information processing system 104 according to the fourth embodiment. As shown in FIG. 18, the information processing system 104 includes the controller 63 and the information processing device 20-4 (HMD).

The controller 63 has a sensor that senses a motion (for example, an acceleration sensor, a gyro sensor, etc.), and outputs a sensor value (motion information) having been sensed to the information processing device 20-4. Moreover, the controller 63 is provided with a physical trigger, and when the trigger is pulled by a user (that is, when a decision operation is performed), the controller 63 outputs a decision instruction to the information processing device 20-4. The controller 63 and the information processing device 20-4 are connected communicatively with wires or wirelessly.

As shown in FIG. 18, the information processing device 20-4 includes a line-of-sight detection camera 12-4, an application processing unit 22-4, a line-of-sight detection unit 23-4, a line-of-sight detection adjustment unit 24-4, and the display unit 30-4.

The application processing unit 22-4 performs various processes in accordance with information output from the controller 63. For example, the application processing unit 22-4 performs display control for the cursor 72 displayed on the display unit 30-4 in accordance with the motion information output from the controller 63. Moreover, the application processing unit 22-4 performs an application process corresponding to an icon selected with the cursor 72 in accordance with a decision instruction output from the controller 63. Furthermore, the application processing unit 22-4 serves as a recognition unit that recognizes the coordinate position of the icon 70 (an example of a target of gaze) displayed on the display unit 30-4.

The line-of-sight detection camera 12-4 is provided on the inner side of the information processing device 20-4, and captures an image of the eyes of the user in a state where the information processing device 20-4 is mounted on the user. The line-of-sight detection camera 12-4 outputs the obtained captured image to the line-of-sight detection unit 23-4.

The line-of-sight detection unit 23-4 performs line-of-sight detection on the basis of the captured image of the eyes of the user captured by the line-of-sight detection camera 12-4. While the user is performing a selection operation with the cursor 72 placed on the icon 70 displayed on the display unit 30-4, the line-of-sight detection adjustment unit 24-3 performs line-of-sight detection calibration. Specifically, the line-of-sight detection adjustment unit 24-4 calculates a correction parameter from a displacement between the line-of-sight positions P sampled continuously from the line-of-sight detection unit 23-4 and the center position of the display region of the icon 70 (an example of a target of gaze) recognized by the application processing unit 22-4 to correct a line-of-sight detection error due to individual differences.

The display unit 30-4 is provided on the inner side of the information processing device 20-4, and is located in front of the eyes of the user in the state where the information processing device 20-4 is mounted on the user.

The configuration of the information processing system 104 has been described above. Note that the configuration of the information processing device 20-4 shown in FIG. 18 is an essential part, and the configuration of the present device is not limited to this. For example, the information processing device 20-4 may further has a speaker, a microphone, an oscillation unit, a biosensor, an acceleration sensor, a gyro sensor, and the like.

(Operation)

Subsequently, an operational process according to the present embodiment will be described referring to FIG. 19. FIG. 19 is a flowchart showing an operational process of line-of-sight detection calibration according to the fourth embodiment.

As shown in FIG. 19, first, in step S603, the line-of-sight detection adjustment unit 24-2 determines whether the cursor 72 has entered the display region of the icon 70 which is the target of gaze. Note that when the display region of the cursor 72 is larger than the icon 70, it may be determined whether the cursor 72 overlaps the icon 70.

Next, if it is determined that the cursor 72 has entered the display region of the icon 70 (S603/Yes), the line-of-sight detection unit 23-4 samples the line-of-sight position P in step S606 on the basis of the captured image captured by the line-of-sight detection camera 12-4. Note that the line-of-sight detection unit 23-4 continuously samples the line-of-sight positions P, and if the cursor 72 has not entered the display region of the icon 70 (S603/No), data being sampled may be cleared.

Then, in step S609, the line-of-sight detection adjustment unit 24-4 determines execution of calibration on the basis of whether a certain time period has elapsed after the cursor 72 enters the display region of the icon 70 and whether a decision operation has been performed. At this time, the line-of-sight detection adjustment unit 24-4 may also check that the line-of-sight position P stays within a certain range to determine execution of calibration. In addition, in the present embodiment, the decision operation is an operation of pulling the trigger provided for the controller 63, for example, and at this time, the controller 63 outputs the decision instruction to the application processing unit 22-4.

Next, if the cursor 72 is released from the display region without a certain time period elapsed after the cursor 72 enters the display region of the icon 70 (S609/No), sampled data is cleared.

On the other hand, if a certain time period has elapsed after the cursor 72 enters the display region of the icon 70 (S609/Yes), the line-of-sight detection adjustment unit 24-4 executes line-of-sight detection calibration in step S612. Specifically, the line-of-sight detection adjustment unit 24-4 corrects a line-of-sight detection error on the basis of a displacement between the center position of the display region of the selected icon 70 and the sampled line-of-sight position P. This is because it is assumed that, in an operation of selecting the icon 70 with the cursor 72 placed on the icon 70, the user is gazing at the icon 70.

In addition, the line-of-sight position P may be an average value of a plurality of pieces of sampled line-of-sight position data, or a standard deviation σ of a plurality of pieces of sampled line-of-sight position data may be calculated, and only data within −2σ may be used.

Then, in step S615, the application processing unit 22-4 performs an application process corresponding to the selected icon.

As described above, the information processing system 104 according to the present embodiment can execute line-of-sight detection calibration in an operation in which a user selects the icon 70 with the cursor 72 placed on the icon 70, and can eliminate the need for an operation merely for line-of-sight detection calibration.

In addition, line-of-sight calibration according to the above-described fourth embodiment can also be performed repeatedly to increase stepwise the accuracy of calibration. For example, by locating the display position of the icons 70-1 to 70-*n* as the target of gaze at a different position each time, the whole display region is gradually covered.

2-5. Fifth Embodiment

Figure 21:
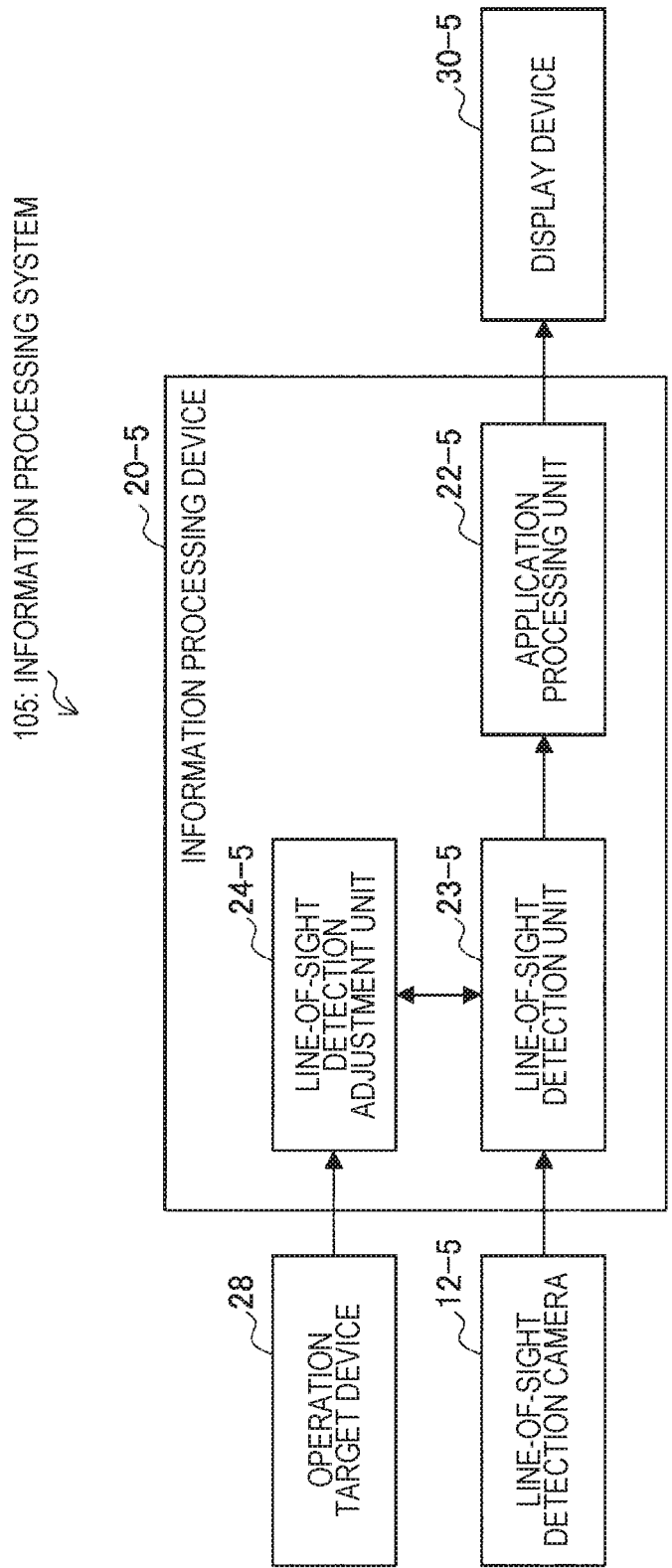
FIG. 21 is a view showing a configuration of an information processing system according to the fifth embodiment.
Figure 22:
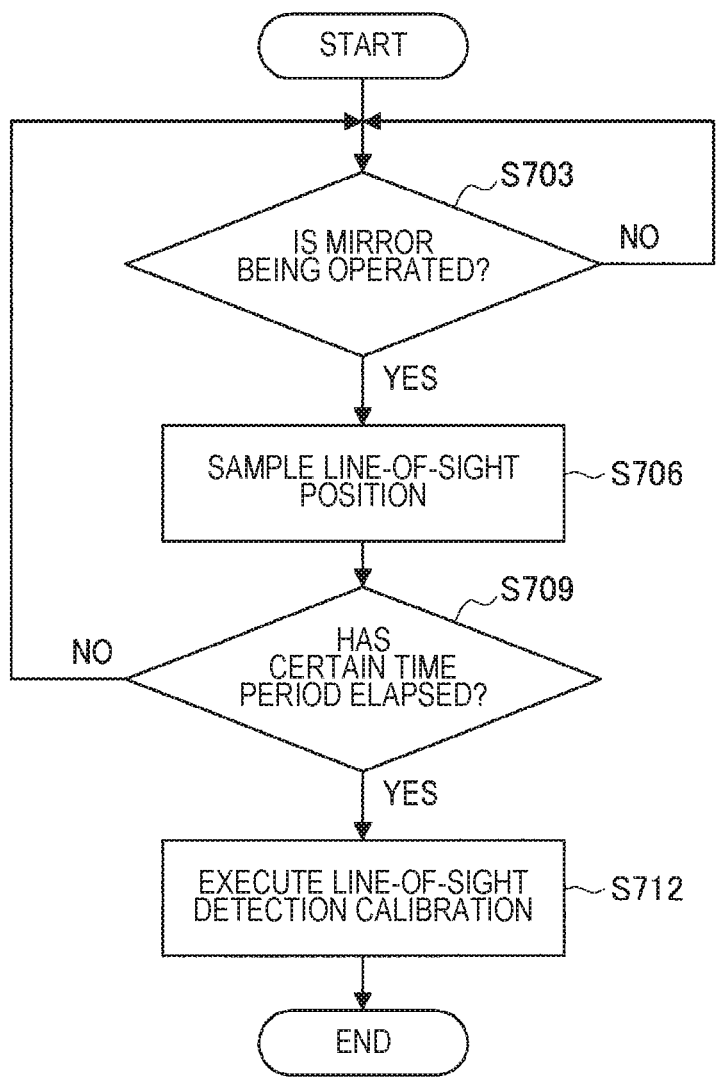
FIG. 22 is a flowchart showing an operational process of line-of-sight detection calibration according to the fifth embodiment.

Next, an information processing system 105 according to a fifth embodiment will be specifically described referring to FIG. 20 to FIG. 22. In the present embodiment, a case of performing line-of-sight detection calibration in an operation of accomplishing an original object of a device in which a user adjusts the angle of a room mirror or a side mirror while in a vehicle will be described.

(Overview)

In the present embodiment, a system is assumed in which display control in accordance with the line of sight of a user is performed in a head up display (HUD) that displays an image on a pop-up transmissive display provided on the front glass of a vehicle or at the upper part of a meter panel. The HUD displays various types of information necessary for driving, such as the running speed, time, and navigation information, in front of a driver, and the driver can check the information without greatly moving the line of sight, which can increase security during running of the vehicle.

FIG. 20 is a view describing line-of-sight detection calibration according to the fifth embodiment. It is usually assumed that a user sitting in the driver's seat of a vehicle puts on the seat belt and adjusts the angle of a room mirror and side mirrors. Therefore, in the present embodiment, as shown in FIG. 20, a camera (a line-of-sight detection camera 12-5) that captures an image of the face of the user sitting in the driver's seat is installed in the vehicle, and an image of the face of the user sitting in the driver's seat is captured to perform line-of-sight detection. Accordingly, since it is assumed that while the user is operating a room mirror 28*a* as shown at the left of FIG. 20, for example, the user is visually recognizing the room mirror 28*a* (an example of a target of gaze), the information processing system 105 is capable of line-of-sight detection calibration based on the installation position of the room mirror 28*a* and the line-of-sight position P. In addition, since it is assumed that while the user is operating a side mirror 28L as shown at the right of FIG. 20, the user is visually recognizing the side mirror 28L (an example of a target of gaze), the information processing system 105 is capable of line-of-sight detection calibration based on the installation position of the side mirror 28L and the line-of-sight position P. An operation of the side mirror 28L is performed by a side mirror adjusting switch 28*b* provided around the driver's seat.

In the present embodiment, line-of-sight detection calibration is executed in an operation of accomplishing an original object of a device of adjusting the angle of a room mirror or a side mirror in this manner while in a vehicle.

(Configuration)

FIG. 21 is a view showing a configuration of the information processing system 105 according to the fifth embodiment. As shown in FIG. 21, the information processing system 105 includes an operation target device 28, the line-of-sight detection camera 12-5, an information processing device 20-5, and a display device 30-5.

The operation target device 28 is a device to be a target of a user operation, to which the room mirror 28*a*, the side mirror adjusting switch 28*b*, or the side mirrors 28L, 28R (not shown in FIG. 20 but provided on the right side of a vehicle) correspond in the present embodiment. The operation target device 28 senses a user operation, and outputs sensed information to a line-of-sight detection adjustment unit 24-5. For example, the room mirror 28*a* is provided with a touch sensor, which is capable of sensing a user operation while the user is manually adjusting the angle of the room mirror 28*a*. Moreover, when adjusting the angle of the side mirror 28L or 28R, the user operates the side mirror adjusting switch 28*b* while visually recognizing the mirror, and therefore, the side mirror adjusting switch 28*b* can sense the user operation on the side mirror 28L or 28R. Furthermore, in a case where the room mirror 28*a* and the side mirrors 28L, 28R are provided with a built-in camera, a user operation can also be sensed by analyzing a captured image. Alternatively, a captured image obtained by the built-in camera may be output to the line-of-sight detection adjustment unit 24-5, and analysis of the captured image and sensing of a user operation may be performed in the line-of-sight detection adjustment unit 24-5.

The line-of-sight detection camera 12-5 is provided in the vehicle, and captures an image of the face of the user sitting in a seat. The line-of-sight detection camera 12-5 outputs the obtained captured image to a line-of-sight detection unit 23-5.

The display device 30-5 is a transmissive display, and provides various types of information necessary for driving, such as the running speed, time, and navigation information, without causing the driver to move the line of sight. Specifically, the display device 30-5 is implemented by at least a part of the front glass or provided in a pop-up manner at the upper part of the meter panel.

The information processing device 20-5 may be mounted on a vehicle, or may be a terminal device installed removably in a vehicle, or may be a mobile device possessed by a user, such as a smartphone or a tablet terminal. The information processing device 20-5 has an application processing unit 22-5, the line-of-sight detection adjustment unit 24-5, and the line-of-sight detection unit 23-5, as shown in FIG. 21.

The application processing unit 22-5 performs display control for the display device 30-5. For example, the application processing unit 22-5 obtains various types of information necessary for driving, such as the running speed, time, and navigation information, and controls the display device 30-5 to display them. The application processing unit 22-5 is also capable of performing display control in accordance with the line of sight detected by the line-of-sight detection unit 23-5.

The line-of-sight detection unit 23-5 performs line-of-sight detection on the basis of a captured image of the eyes of the user captured by the line-of-sight detection camera 12-5. The line-of-sight detection adjustment unit 24-5 performs line-of-sight detection calibration while the user is operating a room mirror or a side mirror. Specifically, the line-of-sight detection adjustment unit 24-5 calculates a correction parameter from a displacement between the line-of-sight positions P sampled continuously from the line-of-sight detection unit 23-5 and the installation position of the room mirror or the side mirror (an example of a target of gaze) to correct a line-of-sight detection error due to individual differences. The installation position of the mirrors is fixed, and thus may be set previously. The line-of-sight detection adjustment unit 24-5 also serves as a recognition unit that recognizes the preset fixed installation position of a mirror which is a target of gaze.

The configuration of the information processing system 105 according to the present embodiment has been specifically described above. Note that the system configuration shown in FIG. 21 is an example, and the present embodiment is not limited to this. For example, the information processing system 105 may be further provided with a speaker device to perform audio output control for the running speed, time information, navigation information, or the like in accordance with the line of sight of the user.

(Operation)

Subsequently, an operational process according to the present embodiment will be described referring to FIG. 22. FIG. 22 is a flowchart showing an operational process of line-of-sight detection calibration according to the fifth embodiment.

As shown in FIG. 22, first, in step S703, the line-of-sight detection adjustment unit 24-5 determines whether a mirror (the room mirror 28a or the side mirror 28L, 28R) is being operated by a user. Specifically, the line-of-sight detection adjustment unit 24-5 makes a determination on the basis of sensed information output from the operation target device 28.

Next, if it is determined that a mirror is being operated (S703/Yes), the line-of-sight detection unit 23-5 samples the line-of-sight position P in step S706 on the basis of a captured image captured by the line-of-sight detection camera 12-5. Note that the line-of-sight detection unit 23-5 continuously samples the line-of-sight positions P, and if it is determined that a mirror is not being operated (S703/No), data being sampled may be cleared.

Then, in step S709, the line-of-sight detection adjustment unit 24-5 determines execution of calibration on the basis of whether the time during which the mirror is operated has exceeded a certain time period. At this time, the line-of-sight detection adjustment unit 24-5 may also check that the line-of-sight position P stays within a certain range to determine execution of calibration.

Next, if the mirror operation has ended without a certain time period elapsed (S709/No), sampled data is cleared.

On the other hand, the time for the mirror operation has exceeded a certain time period (S709/Yes), the line-of-sight detection adjustment unit 24-5 executes line-of-sight detection calibration in step S712. Specifically, the line-of-sight detection adjustment unit 24-5 corrects a line-of-sight detection error on the basis of a displacement between the installation position of the mirror and the sampled line-of-sight position P. This is because it is assumed that, in an operation of adjusting the angle of a mirror, the user is gazing at the mirror.

In addition, the line-of-sight position P may be an average value of a plurality of pieces of sampled line-of-sight position data, or a standard deviation σ of a plurality of pieces of sampled line-of-sight position data may be calculated, and only data within −2σ may be used.

As described above, the information processing system 105 according to the present embodiment can execute line-of-sight detection calibration in an operation in which a user adjusts the angle of a mirror, and can eliminate the need for an operation merely for line-of-sight detection calibration.

2-6. Sixth Embodiment

Figure 23:
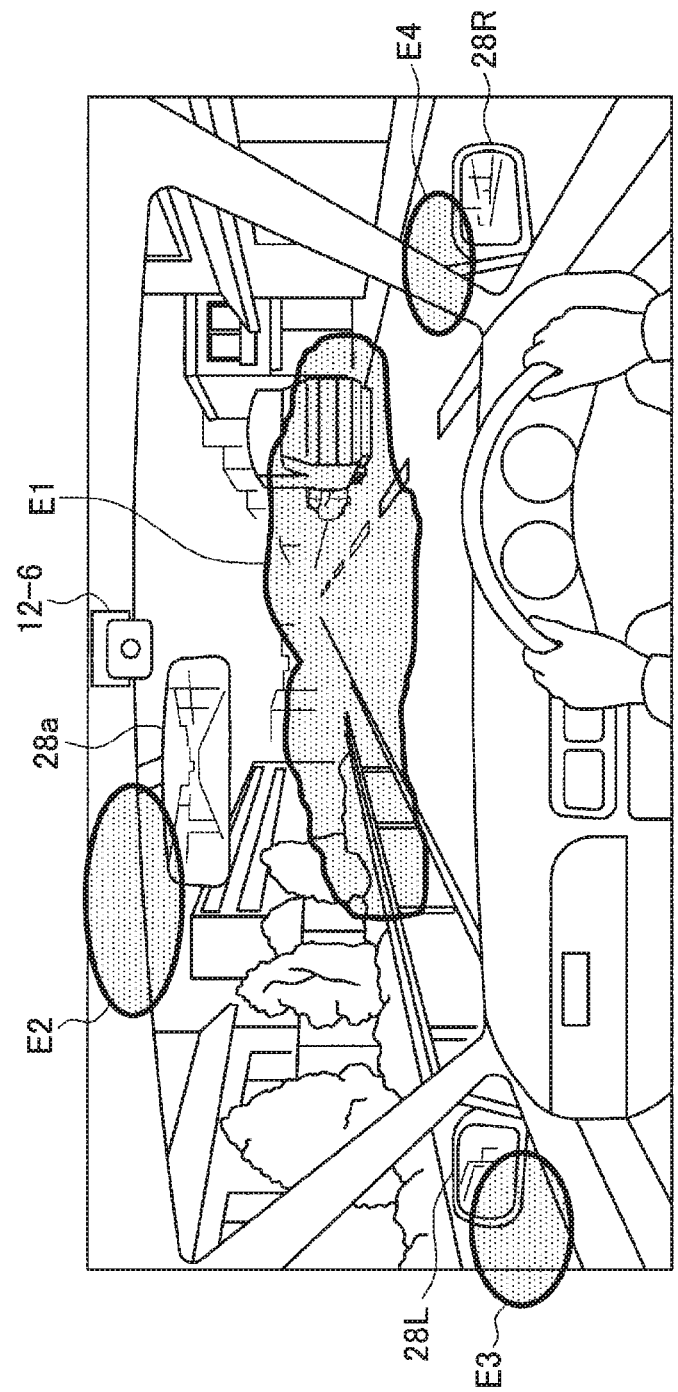
FIG. 23 is a view describing line-of-sight detection calibration according to a sixth embodiment.
Figure 24:
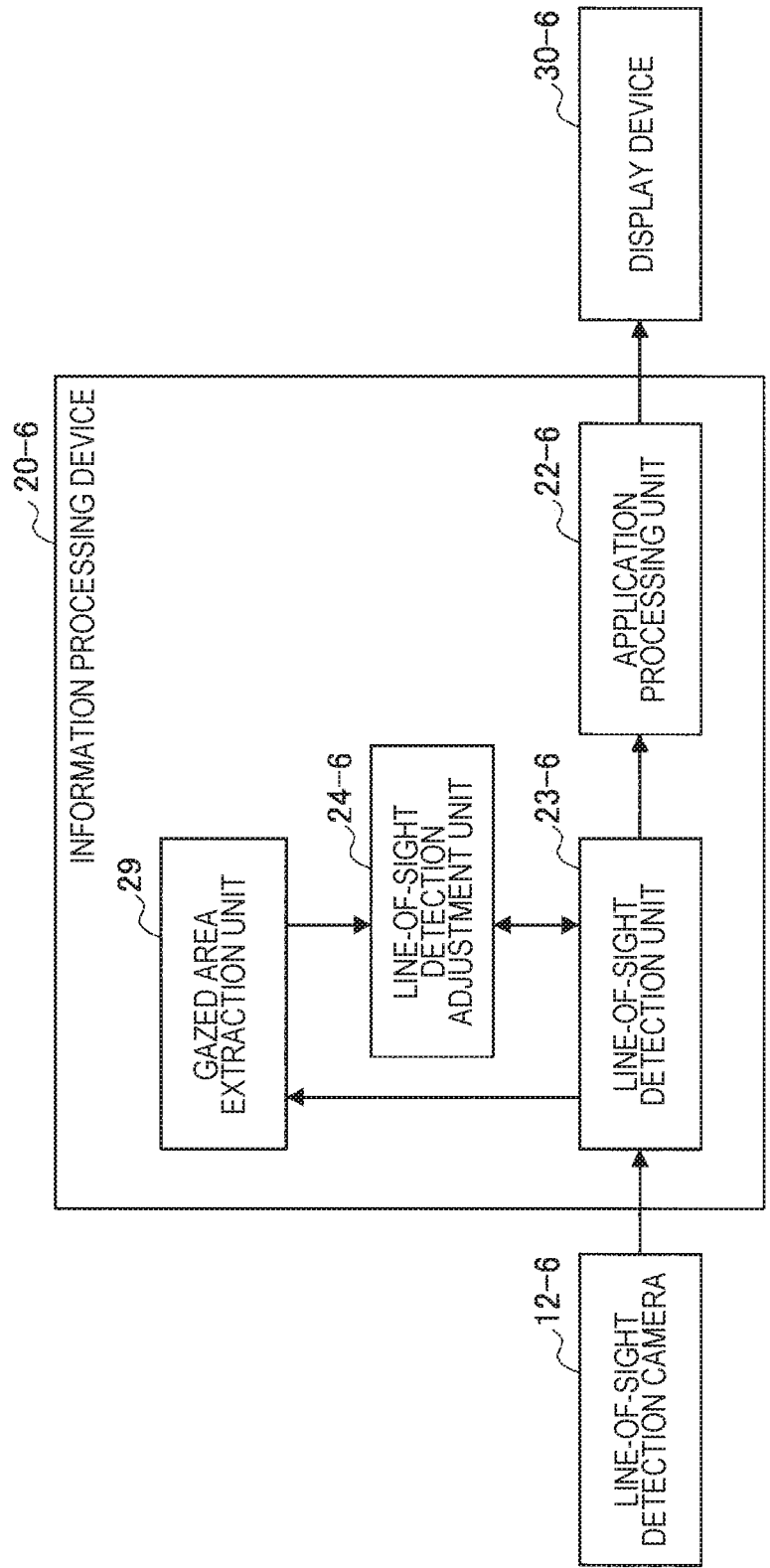
FIG. 24 is a view showing a configuration of an information processing system according to the sixth embodiment.

Next, an information processing system 106 according to a sixth embodiment will be specifically described referring to FIG. 23 to FIG. 25. In the present embodiment, a case of performing line-of-sight detection calibration in an operation of accomplishing an original object of a device of driving a vehicle will be described.

(Overview)

In the present embodiment, similarly to the fifth embodiment, a system is assumed in which display control in accordance with the line of sight of a user is performed in a HUD that displays an image on a pop-up transmissive display provided on the front glass of a vehicle or at the upper part of a meter panel.

FIG. 23 is a view describing line-of-sight detection calibration according to the sixth embodiment. Usually, the line of sight is directed to the forward side during driving of a vehicle, and is directed toward a room mirror or a side mirror besides the forward side. Since the installation place of each mirror is fixed, it is assumed that the distribution of line-of-sight positions while a driver is looking at places except the forward side is likely to concentrate on the installation place of each mirror.

For example, as shown in FIG. 23, images of the face of a user sitting in the driver's seat are continuously captured by a camera provided in the vehicle (a line-of-sight detection camera 12-6) to perform line-of-sight detection on the basis of captured images, and gazed areas E1 to E4 on which the lines of sight are concentrated during driving are obtained. As described above, since it is assumed that the lines of sight of the user during driving are concentrated on the forward side, the room mirror, and the side mirrors (an example of a target of gaze), the gazed area E1 corresponds to the forward side (the front glass), the gazed area E2 corresponds to the room mirror 28a, the gazed area E3 corresponds to the side mirror 28L at the left side, and the gazed area E4 corresponds to the side mirror 28R at the right side, respectively. Therefore, line-of-sight detection calibration can be performed on the basis of each of the gazed area E2 to E4 and the actual installation position of the room mirror 28a, the side mirror 28L, and the side mirror 28R.

In the present embodiment, line-of-sight detection calibration is executed in an operation of accomplishing an original object of a device of looking at a room mirror or a side mirror in this manner during driving of a vehicle.

(Configuration)

FIG. 24 is a view showing a configuration of the information processing system 106 according to the sixth embodiment. As shown in FIG. 24, the information processing system 106 includes the line-of-sight detection camera 12-6, an information processing device 20-6, and a display device 30-6.

The line-of-sight detection camera 12-6 is provided in the vehicle, and captures an image of the face of a user sitting in a seat. The line-of-sight detection camera 12-6 outputs the obtained captured image to a line-of-sight detection unit 23-6.

The display device 30-6 is a transmissive display, and provides various types of information necessary for driving, such as the running speed, time, and navigation information, without causing the driver to move the line of sight. Specifically, the display device 30-6 is implemented by at least a part of the front glass or provided in a pop-up manner at the upper part of the meter panel.

The information processing device 20-6 may be mounted on a vehicle, or may be a terminal device installed removably in a vehicle, or may be a mobile device possessed by a user, such as a smartphone or a tablet terminal. The information processing device 20-6 has an application processing unit 22-6, a line-of-sight detection adjustment unit 24-6, the line-of-sight detection unit 23-6, and a gazed area extraction unit 29, as shown in FIG. 24.

The application processing unit 22-6 performs display control for the display device 30-6. For example, the application processing unit 22-6 obtains various types of information necessary for driving, such as the running speed, time, and navigation information, and controls the display device 30-6 to display them. The application processing unit 22-6 is also capable of performing display control in accordance with the line of sight detected by the line-of-sight detection unit 23-6.

The line-of-sight detection unit 23-6 performs line-of-sight detection on the basis of a captured image of the eyes of the user captured by the line-of-sight detection camera 12-6. The gazed area extraction unit 29 extracts gazed areas on which the lines of sight are concentrated on the basis of the line-of-sight positions of the user during driving continuously detected by the line-of-sight detection unit 23-6.

The line-of-sight detection adjustment unit 24-6 performs line-of-sight detection calibration on the basis of a gazed area extracted by the gazed area extraction unit 29 and the installation position of a corresponding mirror (an example of a target of gaze). Specifically, the line-of-sight detection adjustment unit 24-6 calculates a correction parameter from a displacement between the gazed area and the preset position of a mirror to correct a line-of-sight detection error due to individual differences. The installation position of mirrors is fixed, and thus may be set previously. The line-of-sight detection adjustment unit 24-6 also serves as a recognition unit that recognizes the preset fixed installation position of a mirror which is a target of gaze.

The configuration of the information processing system 106 according to the present embodiment has been specifically described above. Note that the system configuration shown in FIG. 24 is an example, and the present embodiment is not limited to this. For example, the information processing system 106 may be further provided with a speaker device to perform audio output control for the running speed, time information, navigation information, or the like in accordance with the line of sight of the user.

(Operation)

Subsequently, an operational process according to the present embodiment will be described referring to FIG. 25. FIG. 25 is a flowchart showing an operational process of line-of-sight detection calibration according to the sixth embodiment.

As shown in FIG. 26, first, in step S803, the line-of-sight detection unit 23-6 determines whether the vehicle is running. Specifically, for example, the line-of-sight detection unit 23-6 determines whether the vehicle is running on the basis of information sensed by various sensors (not shown), such as an acceleration sensor, a gyro sensor, and a position measuring unit, mounted on the information processing device 20-6.

Next, if it is determined that the vehicle is running (S803/Yes), the line-of-sight detection unit 23-6 samples the line-of-sight position P in step S806 on the basis of a captured image captured by the line-of-sight detection camera 12-6. Note that the line-of-sight detection unit 23-6 continuously samples the line-of-sight positions P, and if it is determined that the vehicle is not running (S803/No), data being sampled may be cleared.

Then, in step S809, the line-of-sight detection adjustment unit 24-5 determines whether a gazed area has been extracted by the gazed area extraction unit 29. The gazed area extraction unit 29 extracts a gazed area on the basis of the line-of-sight positions P of the user during running continuously detected by the line-of-sight detection unit 23-6. Specifically, for example, the gazed area extraction unit 29 separates line-of-sight position data concentrated on the forward side and line-of-sight position data concentrated except on the forward side on the basis of accumulated line-of-sight positions P to extract a gazed area. Note that sampling of the line-of-sight positions is repeated until line-of-sight detection data is accumulated to such an extent that extraction of a gazed area can be performed (S809/No).

Next, a gazed area has been extracted (S809/Yes), the line-of-sight detection adjustment unit 24-6 executes line-of-sight detection calibration in step S812. Specifically, the line-of-sight detection adjustment unit 24-6 corrects a line-of-sight detection error on the basis of a displacement between the extracted gazed area and the installation position of a mirror corresponding to the gazed area. This is because it is assumed that an area on which the line-of-sight positions are concentrated except the forward side during driving is an area corresponding to each mirror.

As described above, the information processing system 106 according to the present embodiment can execute line-of-sight detection calibration in an action in which a user looks at a room mirror or a side mirror during driving, and can eliminate the need for an operation merely for line-of-sight detection calibration.

3. CONCLUSION

As described above, the information processing systems according to the embodiments of the present disclosure can eliminate the need for an operation merely for line-of-sight detection calibration, and can perform line-of-sight detection calibration in a normal user operation.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, the configurations of the information processing devices 20-1 to 20-6 are not limited to the above-described examples, but a communication unit, an operation input unit, a microphone, a speaker, various sensors, or the like may further be provided.

Moreover, the above-described information processing devices 20-1 to 20-6 are implemented by a hardware configuration, such as CPU, ROM, RAM, and a memory unit, and each function (an indicated position detection unit 21, an application processing unit 22, a line-of-sight detection unit 23, a line-of-sight detection adjustment unit 24, and the gazed area extraction unit 29) is executed by them.

Furthermore, a computer program can also be created for causing hardware, such as CPU, ROM, and RAM built in the information processing devices 20-1 to 20-6, to exert the functions of the information processing devices 20-1 to 20-6. A computer-readable recording medium storing the computer program is also provided.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing device including:

a recognition unit configured to recognize a position of a target of gaze following a user operation;

a line-of-sight detection unit configured to detect a line-of-sight position of a user during the user operation; and a line-of-sight detection adjustment unit configured to perform an adjustment to line-of-sight detection performed by the line-of-sight detection unit on the basis of the recognized position of the target of gaze and the line-of-sight position.

(2)

The information processing device according to (1), in which the target of gaze is a virtual object or a real object to be a target of a user operation object.

(3)

The information processing device according to (2), further including:

an application processing unit configured to execute a predetermined application process in accordance with a user operation on the target of gaze.

(4)

The information processing device according to (3), in which the target of gaze is an image icon displayed on a display unit, the user operation is an operation of moving an operation target object into a display region of the image icon, and the line-of-sight detection adjustment unit performs an adjustment to line-of-sight detection on the basis of a line-of-sight position detected when the user moves the operation target object on a display screen into the display region of the image icon and a display position of the image icon.

(5)

The information processing device according to (3), in which the information processing device is a glass-type wearable device having a transmissive display unit, the user operation is an action of indicating an image icon displayed on the display unit with a fingertip, and the line-of-sight detection adjustment unit performs an adjustment to line-of-sight detection on the basis of a line-of-sight position detected when a fingertip recognized on the basis of a captured image captured in a direction of a field of view of the user while the user is wearing the glass-type wearable device moves into a display region of the image icon displayed on the display unit and a display position of the image icon.

(6)

The information processing device according to (4) or (5), in which when the image icon is selected, the application processing unit executes a predetermined application process associated with the image icon.

(7)

The information processing device according to (3), in which the target of gaze is a detection area display displayed on a display screen on which a captured image of the user is displayed in real time, the user operation is an action of moving an object held by the user into the detection area display, and the line-of-sight detection adjustment unit performs an adjustment to line-of-sight detection on the basis of a line-of-sight position detected when the object enters the detection area display and a display position of the detection area display.

(8)

The information processing device according to (7), in which the application processing unit executes a predetermined application process when the object held by the user enters the detection area display.

(9)

The information processing device according to (3), in which the target of gaze is a button image included in a passcode entering screen displayed on a display unit, the user operation is an operation of selecting the button image included in the passcode entering screen to enter a passcode, and the line-of-sight detection adjustment unit performs an adjustment to line-of-sight detection on the basis of a line-of-sight position detected while the user is selecting the button image and a display position of the button image.

(10)

The information processing device according to (9), in which the application processing unit determines whether the passcode entered by selection of the button image included in the passcode entering screen is correct, and the application processing unit executes a lock release process in a case where the passcode is correct.

(11)

The information processing device according to (3), in which the information processing device is a head mounted display (HMD) to be mounted on a head of the user, the target of gaze includes a plurality of selection images displayed on a display unit located in front of eyes of the user while the user is wearing the HMD, the user operation is an operation of selecting a selection image from among the plurality of selection images with an operation target object, and the line-of-sight detection adjustment unit performs an adjustment to line-of-sight detection on the basis of a line-of-sight position detected when the user moves and selects the operation target object on a display screen into a display region of the selection image and a display position of the selection image having been selected.

(12)

The information processing device according to (11), in which the operation target object moves on the display screen in accordance with a motion of a controller connected to the HMD (13)

The information processing device according to any one of (4) to (12), in which a display position of the target of gaze is displayed each time at a different position on the display screen.

(14)

The information processing device according to (2), in which the information processing device is a glass-type wearable device having a transmissive display unit, the user operation is an action of visually recognizing a real object through the display unit, and the line-of-sight detection adjustment unit performs an adjustment to line-of-sight detection on the basis of a line-of-sight position detected when the real object recognized on the basis of a captured image captured in a direction of a field of view of the user while the user is wearing the glass-type wearable device falls within the field of view of the user and a coordinate position on the display unit of the real object visually recognized via the transmissive display unit.

(15)

The information processing device according to (14), in which the real object is a device possessed by the user.

(16)

The information processing device according to (2), in which the target of gaze is a mirror provided for a vehicle, the user operation is an operation of adjusting an angle of the mirror, the line-of-sight detection unit detects a line-of-sight position of the user on the basis of a captured image captured by an image capturing unit provided in the vehicle, and the line-of-sight detection adjustment unit performs an adjustment to line-of-sight detection on the basis of the line-of-sight position detected while the operation of adjusting the angle of the mirror is being performed and a fixed position of the mirror whose angle is being adjusted by the user.

(17)

The information processing device according to (2), in which the target of gaze is a mirror provided for a vehicle, the user operation is an action of visually recognizing the mirror during driving, the line-of-sight detection unit is provided in the vehicle and detects a line-of-sight position of the user on the basis of a captured image captured by an image capturing unit, and the line-of-sight detection adjustment unit performs an adjustment to line-of-sight detection on the basis of a position of a gazed area extracted from a history of line-of-sight positions detected during driving of the user and a fixed position of the mirror corresponding to the gazed area.

(18)

A control method including:

recognizing a position of a target of gaze following a user operation;

detecting a line-of-sight position of a user during the user operation; and performing an adjustment to line-of-sight detection by a line-of-sight detection adjustment unit on the basis of the recognized position of the target of gaze and the line-of-sight position.

(19)

A program for causing a computer to function as:

a recognition unit configured to recognize a position of a target of gaze following a user operation;

a line-of-sight detection unit configured to detect a line-of-sight position of a user during the user operation; and a line-of-sight detection adjustment unit configured to perform an adjustment to line-of-sight detection performed by the line-of-sight detection unit on the basis of the recognized position of the target of gaze and the line-of-sight position.

REFERENCE SIGNS LIST 101 to 106 information processing system
10-1a, 10-1c camera
11-1b, 11-1d indicated position detection camera
11-2 device detection camera
12-1 to 12-6 line-of-sight detection camera
20-1 to 20-6 information processing device
21-1 to 21-6 indicated position detection unit
22-1 to 22-6 application processing unit
23-1 to 23-6 line-of-sight detection unit
24-1 to 24-6 line-of-sight detection adjustment unit
28 operation target device
28a room mirror
28L, 28R side mirror
29 gazed area extraction unit
30-1, 30-2, 30-5, 30-6 display device
30-4 display unit
31 screen
32 touch panel display
40 start icon
43 detection area
45 email icon
49 number button
50 pointer
51 controller
52 fingertip
60 device
63 controller
70 icon
72 cursor

The invention claimed is:

1. An information processing device, comprising:
a recognition unit configured to recognize an image icon on a display unit based on a user operation, wherein the user operation is to move an operation target object into a display region of the image icon on the display unit;
a line-of-sight detection unit configured to:
detect a line-of-sight of a user; and
detect a line-of-sight position of the user on the display unit based on the movement of the operation target object into the display region of the image icon on the display unit, wherein the line-of-sight position corresponds to the detected line-of-sight; and
a line-of-sight detection adjustment unit configured to adjust the detection of the line-of-sight based on a displacement between a center position of the display region of the image icon and the detected line-of-sight position.

2. The information processing device according to claim 1, further comprising an application processing unit configured to execute an application process based on the user operation on the image icon.

3. The information processing device according to claim 2, wherein
the information processing device is a glass-type wearable device having a transmissive display unit,
the user operation is an action that indicates the image icon displayed on the display unit with a fingertip of the user,
the line-of-sight detection unit is further configured to detect the line-of-sight position based on a recognition of the fingertip of the user, and
the recognition of the fingertip of the user is based on a captured image captured in a direction of a field of view of the user.

4. The information processing device according to claim 2, wherein the application processing unit is further configured to
execute the application process based on selection of the image icon.

5. The information processing device according to claim 2, wherein
a target of gaze is a detection area display displayed on the display unit,
a captured image of the user is displayed on the display unit in real time,
the user operation is an action associated with movement of an object into the detection area display, wherein the object is holdable by the user,
the line-of-sight detection unit is further configured to detect the line-of-sight position based on the object that enters the detection area display, and
the line-of-sight detection adjustment unit is further configured to adjust the detection of the line-of-sight based on the detected line-of-sight position and a display position of the detection area display.

6. The information processing device according to claim 5, wherein
the application processing unit is further configured to execute a second application process based on the object that enters the detection area display, and
the object is holdable by the user.

7. The information processing device according to claim 2, wherein
a target of gaze is a button image included in a passcode entering screen displayed on the display unit,
the user operation is an operation associated with selection of the button image included in the passcode entering screen,
the line-of-sight detection adjustment unit is further configured to adjust the detection of the line-of-sight based on the detected line-of-sight position, and
the line-of-sight position is detected based on the selection of the button image and a display position of the button image.

8. The information processing device according to claim 7, wherein
the application processing unit is further configured to:
determine a validity of a passcode entered by the selection of the button image, and
execute a lock release process based on the validity of the passcode.

9. The information processing device according to claim 2, wherein
the information processing device is a head mounted display (HMD) wearable on a head of the user,
a target of gaze includes a plurality of selection images displayed on the display unit, wherein the display unit is in front of eyes of the user,
the user operation corresponds to selection of a selection image among the plurality of selection images,
the line-of-sight detection unit is further configured to detect the line-of-sight position based on the selection of the operation target object, and
the line-of-sight detection adjustment unit is further configured to adjust the detection of the line-of-sight based on the detected line-of-sight position and a display position of the selection image.

10. The information processing device according to claim 9, wherein the movement of the operation target object is based on a motion of a controller connected to the HMD.

11. The information processing device according to claim 1, wherein a display position of the image icon on the display unit is variable with time.

12. The information processing device according to claim 1, wherein
the information processing device is a glass-type wearable device having a transmissive display unit,
the user operation is an action that corresponds to visual recognition of a real object through the display unit,
the line-of-sight detection unit is further configured to detect the line-of-sight position based on the visual recognition of the real object, wherein
the real object is visually recognized based on a captured image captured in a direction of a field of view of the user, and
the real object falls within the field of view of the user, and
the line-of-sight detection adjustment unit is further configured to adjust the detection of the line-of-sight based on the detected line-of-sight position and a coordinate position on the display unit of the real object visually recognized via the transmissive display unit.

13. The information processing device according to claim 12, wherein the real object is a device associated with the user.

14. The information processing device according to claim 1, wherein
a target of gaze is a mirror of a vehicle,
the user operation is an operation associated with adjustment of an angle of the mirror,
the line-of-sight detection unit is further configured to detect the line-of-sight position of the user based on a captured image captured by an image capturing unit in the vehicle,
the line-of-sight detection unit is further configured to detect the line-of-sight position based on the adjustment of the angle of the mirror, and
the line-of-sight detection adjustment unit is further configured to adjust the detection of the line-of-sight based on the detected line-of-sight position and a fixed position of the mirror.

15. The information processing device according to claim 1, wherein
a target of gaze is a mirror of a vehicle,
the user operation is an action that corresponds to visual recognition of the mirror at a time the vehicle is driven,
the line-of-sight detection unit is in the vehicle and is further configured to detect the line-of-sight position of the user based on a captured image captured by an image capturing unit, and the line-of-sight detection adjustment unit is further configured to adjust the detection of the line-of-sight based on a position of a gazed area extracted from a history of a set of line-of-sight positions and a fixed position of the mirror that corresponds to the gazed area.

16. A control method, comprising:
recognizing an image icon on a display unit based on a user operation, wherein the user operation is to move an operation target object into a display region of the image icon on the display unit;
detecting a line-of-sight of a user;
detecting a line-of-sight position of the user on the display unit based on the movement of the operation target object into the display region of the image icon on the display unit, wherein the line-of-sight position corresponds to the detected line-of-sight; and
adjusting the detection of the line-of-sight based on a displacement between a center position of the display region of the image icon and the detected line-of-sight position.

17. A non-transitory computer-readable medium, having stored thereon, computer-executable instructions, which when executed by a processor of a control device, cause the processor to execute operations, the operations comprising:
recognizing an image icon on a display unit based on a user operation, wherein the user operation is to move an operation target object into a display region of the image icon on the display unit;
detecting a line-of-sight of a user;
detecting a line-of-sight position of the user on the display unit based on the movement of the operation target object into the display region of the image icon on the display unit, wherein the line-of-sight position corresponds to the detected line-of-sight; and
adjusting the detection of the line-of-sight based on a displacement between a center position of the display region of the image icon and the detected line-of-sight position.

* * * * *